US012762574B2

(12) United States Patent
Gundappa et al.

(10) Patent No.: US 12,762,574 B2
(45) Date of Patent: Oct. 13, 2026

(54) SYSTEM AND METHOD FOR PRODUCT CARBON FOOTPRINT (PCF) ASSESSMENT

(71) Applicant: Honeywell International Inc., Charlotte, NC (US)

(72) Inventors: Madhukar Gundappa, Bangalore (IN); Naveen Kumar N, Salem (IN); M Krishna, Gurgaon (IN); Ramesh Murugan Natarajan, Chennai (IN); Deanna Fradin-Haines, Bangalore (IN); Sridhar Sankaranarayanan, Hosur (IN); Dhandapani Krishnasamy, Hosur (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 23 days.

(21) Appl. No.: 18/894,020

(22) Filed: Sep. 24, 2024

(65) Prior Publication Data

US 2026/0087501 A1 Mar. 26, 2026

(51) Int. Cl.

*G06Q 30/00* (2023.01)
*G06Q 10/087* (2023.01)
*G06Q 30/018* (2023.01)
*G05B 19/418* (2006.01)

(52) U.S. Cl.

CPC ......... *G06Q 30/018* (2013.01); *G06Q 10/087* (2013.01)

(58) Field of Classification Search

CPC ........................... G06Q 30/018; G06Q 10/087
See application file for complete search history.

(56) References Cited

U.S. PATENT DOCUMENTS

| | | | | |
|---|---|---|---|---|
| 2002/0077718 A1* | 6/2002 | Harburda | G06Q 10/087 | 700/106 |
| 2014/0032380 A1* | 1/2014 | Liu | G06Q 10/087 | 705/28 |
| 2019/0197449 A1* | 6/2019 | Geroulo | G06Q 10/087 | |
| 2022/0284446 A1* | 9/2022 | Kind | H04L 9/3218 | |
| 2025/0021915 A1* | 1/2025 | de Oliveira | G06Q 30/018 | |

OTHER PUBLICATIONS

"Sustainable manufacturing practices: A systematic analysis and guideline for assessing the industrial Product Carbon Footprint". IEEE. 2024. (Year: 2024).*

"Asset Administration Shell Driven (Product) Carbon Footprint Exchange with Data Management Systems". IEEE. 2024. (Year: 2024).*

* cited by examiner

*Primary Examiner* — Maria V Vanderhorst
(74) *Attorney, Agent, or Firm* — Alston & Bird LLP

(57) ABSTRACT

Various embodiments described herein relate to providing and/or employing a system and a method for tracking emissions in a facility. In this regard, inventory data associated with at least one of a product and a process is collected from a plurality of data sources. As a result, a Product Carbon Footprint (PCF) value associated with the at least one of the product and the process is determined based on the inventory data and corresponding emission factors. Based on at least one change in parameters of the inventory data, the inventory data is updated in real-time. As a result, an updated PCF value is determined in real-time based on the updated inventory data. Accordingly, the updated PCF value is displayed via a user interface of a display device.

20 Claims, 8 Drawing Sheets

SYSTEM AND METHOD FOR PRODUCT CARBON FOOTPRINT (PCF) ASSESSMENT

TECHNICAL FIELD

The present disclosure is related to management of emissions in a facility. More particularly, the present disclosure relates to assessing Product Carbon Footprint (PCF) value corresponding to a product and/or a process in real-time in the facility.

BACKGROUND

Generally, Greenhouse gases (GHG) emissions are the primary driver of global climate change. As the GHG emissions increasing rapidly, they build up in the atmosphere and warm the climate, leading to global warming and climate change. It's widely recognized that to avoid the worst impacts of climate change, the world needs to urgently monitor and reduce these emissions. As a result, most of the facilities such as manufacturing or industrial facilities are trying to meet carbon neutral goal. In this regard, Life-Cycle Assessment (LCA) of products and/or processes is very crucial. LCA is increasingly being used as an important and effective tool to address the sustainability needs of the market. LCA is a process of evaluating the effects caused by a product and/or a process on the environment over the entire period of its life. LCA may be used to study the environmental impact of the product, or the function performed by the product. LCA is commonly referred to as a "cradle-to-grave" analysis or a "cradle-to-gate" analysis. According to European Environment Agency (EPA), LCA's key elements are: (1) identify and quantify the environmental loads involved such as but may not be limited to the energy and raw materials consumed, the emissions and wastes generated; (2) evaluate the potential environmental impacts of these loads; and (3) assess the options available for reducing these environmental impacts. However, calculating the accurate LCA value of products and/or processes involves several challenges. One of the main challenges is the requirement of comprehensive data across all life-cycle stages of products and/or processes in order to calculate the LCA value. Incomplete or missing data may lead to inaccurate assessments. Further, the accuracy of LCA results heavily depends on the quality of the data. Poor quality or outdated data may skew results and lead to incorrect conclusions. Therefore, there is a need to calculate the LCA value associated with the products and/or processes accurately and efficiently.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments, in which.

SUMMARY

Figure 1:
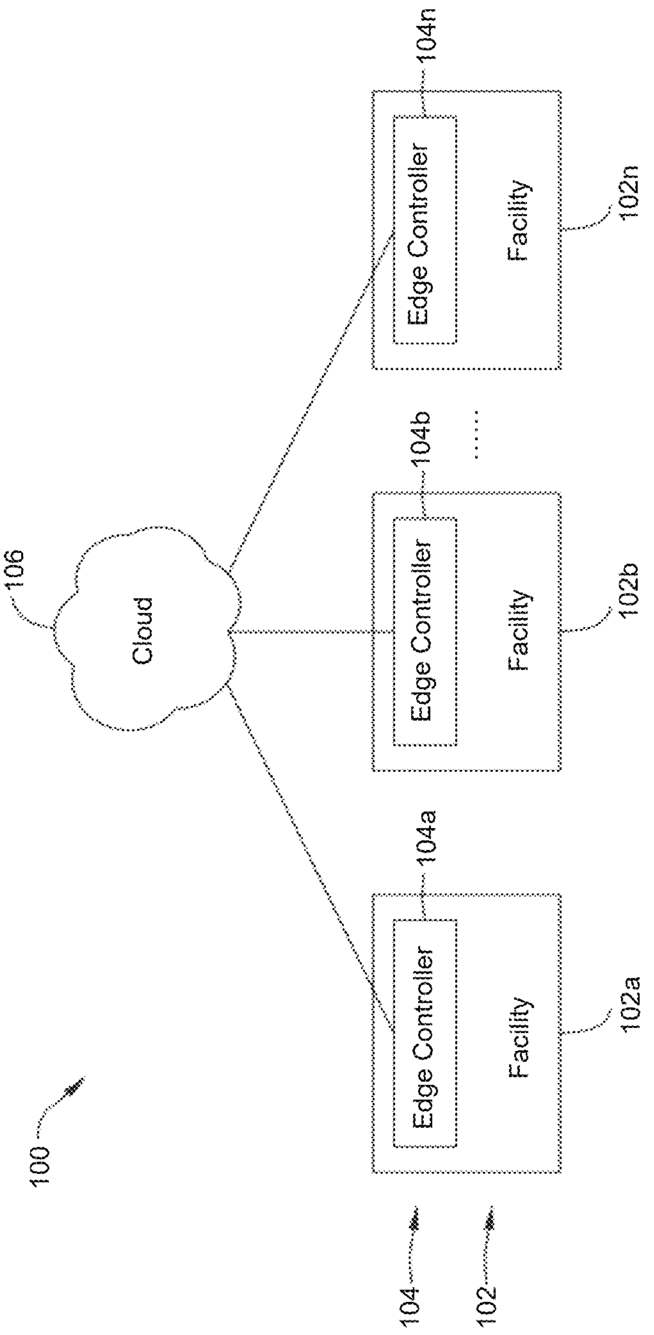
FIG. 1 is a schematic diagram illustrating a facility management system managing a plurality of facilities in accordance with one or more embodiments of the present disclosure.

The details of some embodiments of the subject matter described in this specification are set forth in the accompanying drawings and the description below. Other features, aspects, and advantages of the subject matter will become apparent from the description, the drawings, and the claims.

In accordance with an embodiment of the present disclosure, a system for tracking emissions in a facility is described. The system comprises a processor and a memory communicatively coupled to the processor. The memory comprises one or more instructions which when executed by the processor, cause the processor to collect inventory data associated with at least one of a product and a process from a plurality of data sources in a facility, determine a Product Carbon Footprint (PCF) value associated with the at least one of the product and the process based on the inventory data and corresponding emission factors, update the inventory data in real-time based on at least one change in parameters of the inventory data, determine an updated PCF value in real-time based on the updated inventory data, determine a Life Cycle Assessment (LCA) value associated with the at least one product and the process based on the updated PCF value, and display, via a user interface of a display device, the updated PCF value and the LCA value associated with the at least one of the product and the process.

In accordance with an example embodiment, a method for tracking emissions in a facility is described herein. The method comprises collecting inventory data associated with at least one of a product and a process from a plurality of data sources. The method further comprises determining a Product Carbon Footprint (PCF) value associated with the at least one of the product and the process based on the inventory data and corresponding emission factors. The method further comprises updating the inventory data in real-time based on at least one change in parameters of the inventory data, determining an updated PCF value in real-time based on the updated inventory data, and determining a Life Cycle Assessment (LCA) value associated with the at least one product and the process based on the updated PCF value. In addition, the method further comprises displaying, via a user interface of a display device, the updated PCF value and the LCA value associated with the at least one of the product and the process.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

DETAILED DESCRIPTION

Reference will now be made in detail to embodiments, examples of which are illustrated in the accompanying drawings. In the following detailed description, numerous specific details are set forth in order to provide a thorough understanding of the various described example embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one example embodiment of the present disclosure, and may be included in more than one example embodiment of the present disclosure (importantly, such phrases do not necessarily refer to the same example embodiment).

The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some example embodiments, or it may be excluded.

In one or more embodiments, the systems and methods of the present invention described herein may be applied to a wide variety of products which are produced from raw materials. The term "product" as used in the present invention is broadly defined to encompass various types of goods throughout the value chain. This may include final products for end consumers, intermediate goods for further processing, and raw materials early in the value chain. The final products for end consumers include goods that are ready for sale directly to consumers. These products have completed their manufacturing and processing stages and are intended for final use or consumption. For example, automobiles, smartphones, refrigerator, footwear, camera, medical products, and/or like. The intermediate goods for further processing may include goods which are typically sold to other companies or industries for further processing and manufacturing. These products are not yet in their final form and require additional processing before reaching the end consumer. For example, steel sheets, aluminum extrusions, electronic components such as capacitors, cement, engine components such as piston, and/or like. The raw materials early in the value chain may include basic materials or resources extracted or harvested from nature. These are the initial inputs in the value chain and are processed into intermediate or final goods. For example, iron ore, crude oil, wheat, corn, resin, sand, cotton, ethane, propane, and/or like.

In one or more embodiments, the systems and methods of the present invention described herein may be applied to a wide variety of processes used to manufacture products. The term "process" refers to the sequence of steps or activities involved in transforming raw materials into finished products. It encompasses all the operations, techniques, and methods used to manufacture goods and services, from initial conception through to the final product that is ready for sale or distribution.

One or more example embodiments of the present disclosure may provide an "Internet-of-Things" or "IoT" platform in a facility that uses real-time accurate models and visual analytics to track and manage emissions in the facility. In addition, the IoT platform provides analysis related to emission levels associated with numerous emission sources in the facility and overall emission levels of the facility as well. The IoT platform is an extensible platform that is portable for deployment in any cloud or data center environment for providing an enterprise-wide, top to bottom view, displaying status of processes, assets, people, and/or safety. Further, the IoT platform of the present disclosure supports end-to-end capability to execute digital twins against process data to determine real-time life-cycle assessment (LCA) values associated with the products and/or processes in the facility. Further, appropriate corrective actions may be recommended to reduce the emissions.

A facility such as a manufacturing facility or an industrial facility often involves numerous assets such as machinery and equipment to ensure efficient manufacturing of certain products and co-products by carrying out production processes in the facility. These assets may be required to handle one or more raw materials or intermediate products. Also, the process involves several workflows to convert raw materials to finished products. In this regard, there are certain workflows that may contribute to emissions. Per this aspect, assets which handle such workflows will be responsible for the emissions. So, overall emissions of the facility depend on contribution of emissions by each of such assets. At times, contribution to emissions by each asset is unknown. Accordingly, this inhibits the personnel to take appropriate actions to manage emissions in the facility. This leads to poor management of emissions in the facility.

Nowadays, most of the facilities are trying to meet carbon neutral goal. The overall emissions caused by different assets in the facility must be within the guidelines issued by the government agencies or regulatory bodies or environmental agencies. However, there are certain emissions that cannot be controlled. In this regard, Life-Cycle Assessment (LCA) of products and/or processes is very crucial. LCA is increasingly being used as an important and effective tool to address the sustainability needs of the market. LCA is a systematic method for evaluating the potential environmental impacts associated with all stages of products, processes, or services across its entire life cycles. This includes considering all relevant stages such as acquisition of resources or raw materials, processing, manufacturing, distribution, use, and disposal. LCA considers various environmental indicators such as Greenhouse gas (GHG) emissions, Ozone depletion, Acidification, Eutrophication, Resource Consumption, Human toxicity, Particulate Matter formation, Energy use, Emissions to air, water, and soil, and/or like. LCA provides a holistic view of a product's environmental footprint.

Further, Product Carbon Footprint (PCF) is a specific metric that measures and quantifies the total amount of GHG emissions, specifically carbon dioxide (CO2) emissions, and other equivalents such as methane (CH4) emissions associated with a product and/or a process over different stages of its life cycle. PCF helps end users of the product and/or process to understand the total GHG emissions generated in the entire life cycle. The facilities may aim to identify and measure GHG emissions of individual products and processes for all the relevant stages that helps in analyzing Global Warming Potential (GWP). While conducting LCA, the facilities may aim to measure PCF from cradle-to-gate or cradle-to-grave. Cradle-to-gate considers all processes from acquisition of resources through manufacturing and the production of the final product before it leaves the company gate. Cradle-to-grave considers all processes throughout the life cycle of the product from resource extraction ('cradle') to the use phase and disposal phase ('grave').

Currently, one of the main challenges faced by the facilities is to accurately measure the PCF due to different types of emissions associated with the product and/or processes. In general, there are three types of emissions—Scope 1, Scope 2, and Scope 3. Scope 1 emissions are direct greenhouse (GHG) emissions that occur from sources that are controlled or owned by an organization (e.g., emissions associated with fuel combustion in boilers, furnaces, vehicles). Scope 2 emissions are indirect GHG emissions associated with the purchase of electricity, steam, heat, or cooling. Although scope 2 emissions physically occur at other facility where they are generated, they are attributed to the facility's GHG inventory because the energy is used by the facility. Scope 3 emissions are the result of activities from assets not owned or controlled by the facility, but indirectly affects the value chain of the facility. Specifically, Scope 3 emissions include the GHG emissions of raw materials obtained from suppliers. The facility's value chain consists of both its upstream and downstream activities. The GHG Protocol defines 15 categories of scope 3 emissions. Scope 3 emission sources include emissions from both upstream and downstream activities of the facility. This includes emissions from the entire value chain, such as upstream emissions from purchased goods and services, capital goods, fuel and energy related activities, upstream transportation and distribution, operational waste, business travel, employee commuting, upstream leased assets, and/or investments, and downstream emissions from downstream transportation and distribution, processing of sold products, use of sold products, end-of-life treatment of products, downstream leased assets, and/or Franchises.

Traditional tools calculate Scope-1 & Scope-2 emissions and provide a static product carbon footprint that facilitates manual static input of values. Scope 1 and Scope 2 emissions are relatively straightforward to calculate because they involve direct control or ownership of emission sources, and facilities are generally aware of global emission factors which are easily available. However, facilities are facing challenges in determining the Scope 3 emissions because Scope 3 emissions cover a wide range of indirect emissions along the entire value chain of the facility and further, gathering comprehensive data on Scope 3 emissions may be challenging due to the involvement of numerous suppliers, customers, and other stakeholders. In addition, many facilities may not have direct control over or access to all relevant data points. Therefore, Scope 3 emission calculations require a more comprehensive and collaborative approach due to their indirect nature.

In addition, the PCF involves very detailed calculations (leveraging primary databases) with many assumptions and historical averages over a period of one or more years. This is due to consideration of different types of emissions. As a result, this static data results in static PCF that many a times is significantly different than the actual PCF due to the assumptions and may end up in not meeting the regulation guidelines. In this regard, one of main challenges faced by facilities is to calculate dynamic real-time PCF accurately and efficiently.

Furthermore, the accurate calculation of a Carbon Intensity (CI) is very important that helps organizations to manage their carbon footprint, reduce emissions, comply with regulations, and improve sustainability practices. It is very crucial in the broader context of environmental management and climate change mitigation. Calculating an accurate Carbon Intensity to adhere to these regulations and obtain financial credits/incentives from the government agencies is a must. To address the challenge of meeting the Waste Emission Charge under Environmental Protection Agency (EPA) regulations with CI below 0.2%, leveraging dynamic input information for CI calculation is indeed a strategic move. The static models, like the 45VH2-GREET 2023 model, which use a default methane leakage value (e.g., 0.94%), can be too conservative or inaccurate when compared to actual, lower leakage rates of Responsibly Sourced Natural Gas (RSG). This results in higher-than-necessary CI calculations. In this regard, another challenge faced by facilities is to calculate dynamic real-time product carbon intensity and/or operational carbon intensity.

Therefore, there is need to determine the dynamic real-time PCF of a product and/or process that helps in constant and real-time monitoring of the GHG emissions in the facility. The real-time PCF also helps in calculating real-time product carbon intensity and/or operational carbon intensity. This helps facilities to assign the dynamic carbon footprint rather than static carbon footprint to the products based on the batch wise conditions of raw materials or continuous changing conditions. The real-time PCF helps in recognizing products with lower carbon footprints by accounting for time-specific factors. Notably, real-time PCFs consider the variability in carbon intensity of the electricity grid at different times, as well as supply chain sources affected by batch sizes. With this dynamic information, a manufacturing facility can strategically schedule production to minimize carbon emissions during certain hours, while higher emissions might be inevitable at other times of the day, month, or season due to these fluctuations. The real time PCF enables manufacturers to identify the phases (time of day) when low carbon intense products are produced. This enables manufacturers to get premiums for the low carbon products by guarantying the value chain carbon intensity. Moreover, without much investment in technology upgrades, the manufacturers may identify batches of products that have lower embedded carbon emissions. Further, while calculating the real-time PCF, the present invention discloses a flexibility to incorporate measure-informed natural gas value chain leakage rates instead of relying solely on emission factors is indeed a significant advantage. Also, there is a need to perform faster corrective actions to meet the regulatory guidelines.

Thus, to address the above challenges, various examples of systems and methods described herein relate to managing emissions in the facility. In this regard, various example embodiments described herein facilitate an emission tracking system used to assess real-time life-cycle assessment (LCA) values and/or product carbon footprint values of products/processes in the facility. Per this aspect, the systems and methods described herein collect inventory data associated with the products and/or processes continuously in real-time from a plurality of data sources. The inventory data may include detailed information related to activities and resources expended during the manufacturing or production process. Further, various example embodiments described herein determine a Product Carbon Footprint (PCF) value associated with the at least one of the product and the process based on the inventory data and corresponding emission factors. Further, various example embodiments described herein determine at least one change in parameters of the inventory data based on a threshold PCF value. The threshold PCF value depends on at least one of industry standards, regulations, a quantity of raw material, type of raw material, type of the product, type of the process, and a geographical location of the facility. The threshold PCF value indicates a maximum acceptable carbon footprint value for the product and/or process. Further, various example embodiments described herein update the inventory data in real-time based on at least one change in parameters of the inventory data. Further, various example embodiments described herein determine an updated PCF value in real-time based on the updated inventory data. Further, various example embodiments described herein display, via a user interface of a display device, the updated PCF value associated with the at least one of the product and the process. Further, various example embodiments described herein determine PCF values associated with different stages of the life-cycle assessment of the product and/or process in the facility.

Further, various example embodiments described herein translate the determined PCF value to understandable insights. In one example, the insights may be related to carbon offsetting in the facility. In yet another example, the insights may be opportunities or corrective actions for managing emissions such as, but not limited to replacing raw materials by using sustainable alternatives or low carbon options, adjusting the quantity of raw material, using alternate source of energy such as transitioning to renewable energy sources, improving process efficiency, reducing waste and emissions such as installing emission control technologies to capture and reduce pollutants released during production, enhancing product design such as incorporating design that reduces material use, enhance durability, and facilitate recycling, engaging in carbon offsetting, replacing at least one asset, servicing at least one asset in the facility, and/or the like. The insights may be in the form of reports, trends, charts, graphs, and/or like. The aforementioned exemplary insights facilitate the systems and methods described herein to undertake relevant actions so as to efficiently manage the emissions in the facility.

In addition, the systems and methods described herein also render the insights on a display. For example, the display may be of a mobile device associated with personnel in the facility. The systems and methods described herein translate the determined PCF value to understandable insights so that the personnel even with minimal domain knowledge may understand and relate context of the insights. This facilitates the user to make appropriate decisions and undertake relevant actions to manage emissions in the facility. In some situations, the personnel may also apply their domain knowledge to additionally provide feedback on the insights rendered on the display so that the relevancy of insights may be improved.

FIG. 1 illustrates a schematic diagram showing a facility management system to manage multiple facilities in accordance with one or more example embodiments described herein. According to various example embodiments described herein, the exemplary facility management system 100 comprises one or more facilities 102*a*, 102*b*, . . . 102*n* (collectively "facilities 102"). In this regard, a facility of the one or more facilities 102*a*, 102*b*, . . . 102*n* may correspond to, for example, an industrial plant, a production plant, a refinery, a factory, an industry, a corporate office, a logistics environment, a transportation hub, a material handling environment, a warehouse, a distribution center, a sortation center, a supply chain environment, a manufacturing unit, a pharmaceutical unit, a production plant, and/or the like. In some example embodiments, the one or more facilities 102*a*, 102*b*, . . . 102*n* in the illustrative system 100 may be of same type. In some example embodiments, the one or more facilities 102*a*, 102*b*, . . . 102*n* in the illustrative system 100 may be of different type. As it may be understood, in some example embodiments described herein, each of the facilities 102 often include one or more assets such as valves, pumps, compressors, pipelines, boilers, chillers, fans, turbines, machineries, controllers, and/or the like based on a nature of the facility. But generally, the one or more assets are operated to handle one or more processes in the facility. For example, if the facility corresponds to a production plant, then the one or more assets are operated to handle an industrial process. In some instances, the industrial process may correspond to a production process to produce tangible materials. However, at times, it should be noted that the process to produce tangible materials may lead to several emissions. There may be several factors responsible for such emissions. In an example, type of materials (say, hydrocarbons, carbon dioxide, hydrogen sulfide, nitrogen, aluminum, and/or the like) handled by the one or more assets are responsible for emissions. In another example, leakages, loose connections, and/or the like are also responsible for emissions. Though these are few exemplary factors contributing to emissions, there may be several other factors too. As long as the emissions are detrimental and violate emission limits set by regulatory, it becomes necessary to identify factors contributing to emissions so that actions may be taken in a timely manner to manage the emissions.

Further, in one or more example embodiments described herein, each of the one or more facilities 102*a*, 102*b*, . . . 102*n* includes a respective edge controller 104*a*, 104*b*, . . . 104*n* (collectively "edge controllers 104"). Per this aspect, the edge controller of the respective facility collects data associated with the one or more assets in the facility. In accordance with some example embodiments, one or more sensors are employed in the facility to sense the data associated with the one or more assets. In this regard, the one or more sensors sense data such as emission level associated with the one or more assets, a type of material handled by the one or more assets, a process that is handled by the one or more assets, and/or the like. In accordance with some example embodiments, the one or more sensors is communicatively coupled with the edge controller of the facility. Accordingly, the edge controller of the facility receives the data associated with the one or more assets via the one or more sensors. In addition, in some example embodiments, the edge controllers 104 process the data received from the one or more sensors to derive insights associated with each of the one or more assets. In this regard, the insights may be related to emission levels, and/or the like associated with each of the one or more assets. Also, in some example embodiments, the edge controllers 104 predict trends and/or undertake one or more corrective actions to offset the emissions within the facility.

Further, in some example embodiments, the one or more facilities 102*a*, 102*b*, . . . 102*n* may be operably coupled with a cloud 106, meaning that communication between the cloud 106 and the one or more facilities 102*a*, 102*b*, . . . 102*n* is enabled. In some example embodiments, the one or more edge controllers 104*a*, 104*b*, . . . 104*n* may be communicatively coupled to the cloud 106. The cloud 106 may represent distributed computing resources, software, platform or infrastructure services which may enable data handling, data processing, data management, and/or analytical operations on the data exchanged & transacted amongst the facilities 102. In accordance with some example embodiments, the data collected by the edge controllers 104 is uploaded to the cloud 106 for processing. Further, in accordance with some example embodiments, the cloud 106 processes the data to determine the emission levels, and/or the like associated with each of the one or more assets. In this regard, the cloud 106 also derives the insights associated with the emission levels, and/or the like. Also, in some example embodiments, the cloud 106 may generate one or more opportunities and/or corrective actions based on the derived insights. Additionally, in some example embodiments, the cloud 106 may transmit the one or more opportunities and/or corrective actions to a respective edge controller of the one or more edge controllers 104*a*, 104*b*, . . . , 104*n* in the facility. Also, in some example embodiments, the cloud 106 may transmit the insights, the one or more opportunities, and/or corrective actions to a mobile device associated with the personnel in the facility.

In some example embodiments, the one or more edge controllers 104*a*, 104*b*, . . . 104*n* may operate as intermediary node to transact data between a respective facility and/or the cloud 106. In some example embodiments, each of the one or more edge controllers 104*a*, 104*b*, . . . 104*n* is capable of processing and/or filtering the collected data so as to be compatible with the cloud 106. In some example embodiments, each of the one or more facilities 102*a*, 102*b*, . . . 102*n* may comprise a respective gateway to transact data between a respective facility and/or the cloud 106. Accordingly, in some example embodiments, gateway may operate as intermediary node to transact data between a respective facility and/or the cloud 106. In some example embodiments, the cloud 106 includes one or more servers that may be programmed to communicate with the one or more facilities 102*a*, 102*b*, . . . 102*n* and to exchange data as appropriate. The cloud 106 may be a single computer server or may include a plurality of computer servers. In some example embodiments, the cloud 106 may represent a hierarchal arrangement of two or more computer servers, where perhaps a lower level computer server (or servers) processes telemetry data, for example, while a higher-level computer server oversees operation of the lower level computer server or servers.

Figure 2:
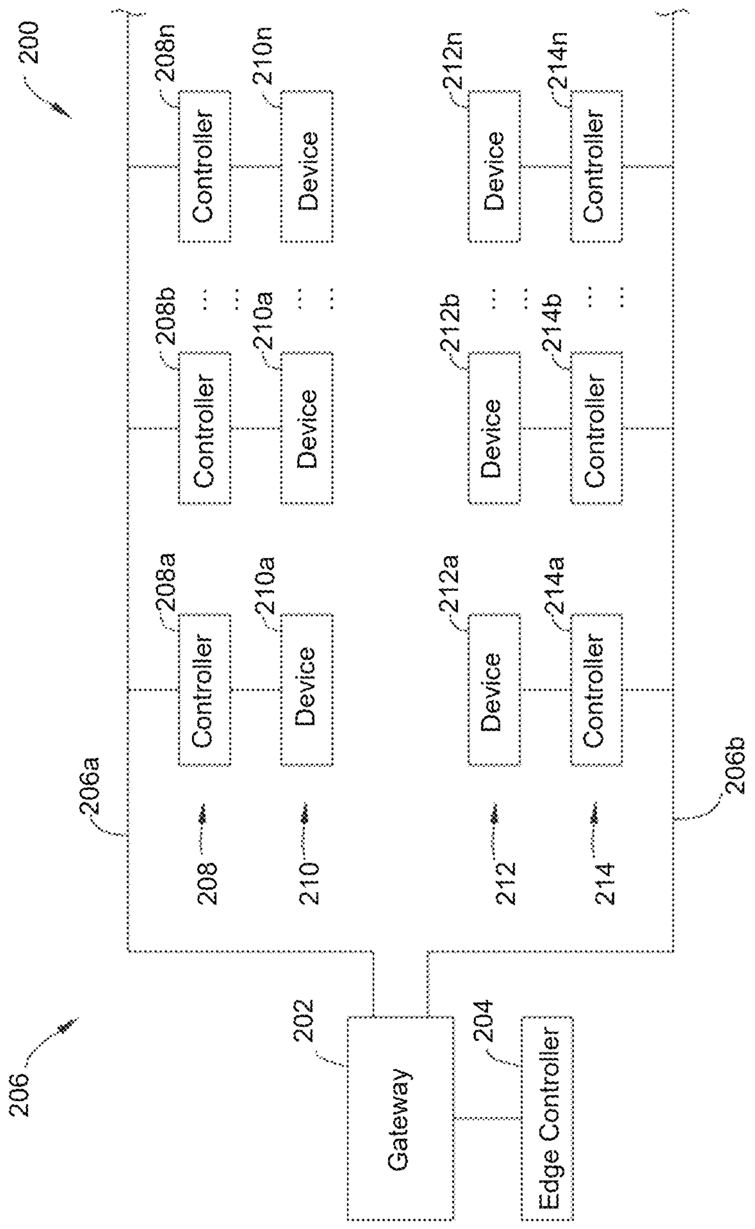
FIG. 2 is a schematic diagram illustrating an exemplary facility of the plurality of facilities in accordance with one or more embodiments of the present disclosure.

FIG. 2 illustrates a schematic diagram showing an exemplary facility in accordance with one or more example embodiments described herein. In one or more example embodiments, an example facility 200 described herein corresponds to one of the facilities 102 described in accordance with FIG. 1 of the current disclosure. In various example embodiments, the example facility 200 of FIG. 2 comprises assets communicatively coupled via multiple networks 206 (e.g., communication channels). For instance, as illustrated in FIG. 2, the facility 200 includes a first network 206*a* and a second network 206*b*. In some example embodiments, the facility 200 may include only a single network 206. In some example embodiments, the facility 200 may include multiple networks 206. Each of the networks 206 may include any available network infrastructure. In some example embodiments, each of the networks 206 may independently be, for example, a BACnet network, a NIAGARA network, a NIAGARA CLOUD network, or others. Accordingly, in some example embodiments, the facility 200 comprises a plurality of assets and/or devices in communication with a gateway 202 via corresponding communication channel (e.g., networks 206*a* and/or 206*b*). Said differently, each of the network represents a sub-network supported by an underlined network communication/IoT protocol and incorporating a cluster of endpoints (e.g. assets, controllers etc. in building facility).

In some example embodiments, one or more first assets 210*a*, 210*b*, . . . 210*n* (collectively "first assets 210") are operably coupled to the first network 206*a* via one or more first controllers 208*a*, 208*b*, . . . 208*n* (collectively "first controllers 208"). In some other example embodiments, the first controllers 208 are operably coupled to one or more sensors associated with different types of the first assets 210 within the facility 200. The first assets 210 represent different types of emission sources that are present within the facility 200. The emission sources may include, but not limited to, stationary sources, mobile sources, process emissions, or indirect sources. In some example embodiments, at least some of the first assets 210 are, but not limited to actuators, valves, turbines, boilers, chillers, compressors, pumps, and/or the like. In this regard, the one or more sensors may correspond to cameras, gas detectors, flow meters, temperature sensors, pressure sensors, heat sensors, flow rate sensors, position sensors, and/or the like. Per this aspect, the one or more sensors sense telemetry data such as emission levels, a type of material handled, a process handled, and/or the like associated with the first assets 210. The emission levels may be calculated via the flow meters, or direct measurement methods such as, but not limited to, gas cloud imaging (GCI), sensors, drones, satellites, etc. In an example, the flow meters may be installed on relevant equipment or pipelines to measure the amount of fuel consumed over a specific period. In another example, the drones may collect visual or sensor data to assess the scale and intensity of activities related to the emissions sources. In yet another example, a gas cloud imaging (GCI) camera may be used to sense emission data (say, gas speciation and concentration along with geospatial co-ordinates) associated with at least some of the emission sources. In this regard, the gas cloud imaging (GCI) camera transmits the emission data to a corresponding first controller of the first controllers 208. In some example embodiments, the overall emissions at the specific site or the facility may be calculated using emission factors that quantify an amount of $CO_2$-equivalent emissions produced per unit of activity or energy consumed. Further, in some example embodiments, the one or more sensors transmit the telemetry data to the first controllers 208.

In some example embodiments, the first controllers 208 control operation of at least one of the first assets 210. In this regard, the first controllers 208 process and/or analyze the telemetry data to derive one or more insights for at least some of the first assets 210 in the facility 200. In this regard, the insights may be related to the emission levels, and/or the like associated with at least some of the first assets 210. Also, in some example embodiments, the first controllers 208 may determine Life-Cycle Assessment (LCA) values associated with the products manufactured using the first assets 210 and/or processes performed using the first assets 210 and/or undertake one or more corrective actions based at least on the LCA values and the derived insights to control at least some of the first assets 210 and manage emissions of the facility 200. Based on the determined LCA value, the first controllers 208 may recommend appropriate action(s) to offset the emissions in the facility 200. In accordance with some example embodiments, the first controllers 208 may be built into one or more of the corresponding first assets 210 and need not be a separate component. Whereas, in accordance with some other example embodiments, the first controllers 208 may be virtual controllers that may be implemented within a virtual environment hosted by one or more computing devices (not illustrated). In another example embodiment, at least some of the first assets 210 may be controllers. In such case, the first assets 210 need not have a separate corresponding controller of the first controllers 208.

In some example embodiments, one or more second assets 212*a*, 212*b*, . . . 212*n* (collectively "second assets 212"), are operably coupled to the second network 206*b* via one or more second controllers 214*a*, 214*b*, . . . 214*n* (collectively "second controllers 214"). In some other example embodiments, the second controllers 214 are operably coupled to one or more sensors associated with different types of the second assets 212 within the facility 200. The second assets 212 represent different types of emission sources that are present within the facility 200. The emission sources may include, but not limited to, stationary sources, mobile sources, process emissions, or indirect sources. In some example embodiments, at least some of the second assets 212 are, but not limited to actuators, valves, turbines, boilers, chillers, compressors, pumps, and/or the like. In this regard, the one or more sensors may correspond to cameras, gas detectors, flow meters, temperature sensors, pressure sensors, heat sensors, flow rate sensors, position sensors, and/or the like. Per this aspect, the one or more sensors sense telemetry data such as emission levels, a type of material handled, a process handled, and/or the like associated with the second assets 212. The emission levels may be calculated via the flow meters, or direct measurement methods such as, but not limited to, gas cloud imaging (GCI), sensors, drones, satellites, etc. In an example, the flow meters may be installed on relevant equipment or pipelines to measure the amount of fuel consumed over a specific period. In another example, the drones may collect visual or sensor data to assess the scale and intensity of activities related to the emissions sources. In yet another example, a gas cloud imaging (GCI) camera may be used to sense emission data (say, gas speciation and concentration along with geospatial co-ordinates) associated with at least some of the emission sources. In this regard, the gas cloud imaging (GCI) camera transmits the emission data to a corresponding second controller of the second controllers 214. In some example embodiments, the overall emissions at the specific site or the facility may be calculated using emission factors that quantify an amount of CO2-equivalent emissions produced per unit of activity or energy consumed. Further, in some example embodiments, the one or more sensors transmit the telemetry data to the second controllers 214.

In some example embodiments, the second controllers 214 control operation of at least one of the second assets 212. In this regard, the second controllers 214 process and/or analyze the telemetry data to derive one or more insights for at least some of the second assets 212 in the facility 200. In this regard, the insights may be related to the emission levels, and/or the like associated with at least some of the first assets 210. Also, in some example embodiments, the second controllers 214 may determine LCA values associated with the products manufactured using the first assets 210 and/or processes performed using the first assets 210 and/or undertake one or more corrective actions based at least on the LCA values and the derived insights to control at least some of the second assets 212 and manage emissions of the facility 200. Based on the determined LCA value, the second controllers 214 may recommend an appropriate action(s) to offset the emissions in the facility 200. In accordance with some example embodiments, the second controllers 214 may be built into one or more of the corresponding second assets 212 and need not be a separate component. Whereas, in accordance with some other example embodiments, the second controllers 214 may be virtual controllers that may be implemented within a virtual environment hosted by one or more computing devices (not illustrated). In another example embodiment, at least some of the second assets 212 may be controllers. In such case, the second assets 212 need not have a separate corresponding controller of the second controllers 214.

Further, in some example embodiments, the facility 200 includes a gateway 202 that is operably coupled with the first network 206*a* and the second network 206*b*. In one example embodiment, the gateway 202 may be operably coupled with the first network 206*a* but not with the second network 206*b*. In another example embodiment, the gateway 202 may be operably coupled with the second network 206*b* but not with the first network 206*a*. Accordingly, in some example embodiments, the gateway 202 is a legacy controller. In some example embodiments, the gateway 202 may be absent. In accordance with some example embodiments, an edge controller 204 is installed within the facility 200. In some example embodiments, the edge controller 204 may be operably coupled with the gateway 202. In this regard, the edge controller 204 serves as an intermediary node between the first controllers 208, the second controllers 214, and the cloud 106 (as described in accordance with FIG. 1 of the current disclosure). For instance, in an example, the edge controller 204 may pull data from the first controllers 208 and the second controllers 214 and provide the data to the cloud 106. In an example embodiment, the edge controller 204 is configured to discover the first assets 210, the second assets 212, the first controllers 208, and/or the second controllers 214 that are connected along a local network such as the network 206. In an example embodiment, the network protocol of the network 206 includes discovery commands that, for example, are used to request that all assets connected to the network 206 identify themselves. Whereas, in another example, the edge controller 204 is configured to discover the first assets 210 and the second assets 212 regardless of an underlaying protocol supported by the first assets 210 and the second assets 212. In other words, the edge controller 204 may discover the first assets 210 and the second assets 212 supported by different protocols (e.g., BACnet, Modbus, LonWorks, SNMP, MQTT, Foxs, OPC UA etc.).

Further, in some example embodiments, the edge controller 204 interrogates any assets it finds operably coupled to the network 206 to obtain additional information from those assets that further helps the edge controller 204 and/or the cloud 106 identify the connected assets (such as, but not limited to actuators, valves, compressors, pumps), functionality of the assets, connectivity of the local controllers and/or the assets, types of operational data that is available from the local controllers and/or the assets, types of alarms that are available from the local controllers and/or the assets, and/or any other suitable information. For purpose of brevity, the additional information requested from the assets is referred interchangeably as, 'metadata', 'semantic data', or 'the model data', hereinafter throughout the description.

More generally, and in some example embodiments, the edge controller 204 is communicatively coupled to one or more assets, via one or more networks. For purpose of brevity, the term 'assets' is also referred interchangeably to as 'data points', 'end points', 'devices', 'sensors', or 'electronic devices' throughout the description. According to various example embodiments described herein, the assets may be, for example, but not limited to, sensors, electronic components, pressure valves, HVACs, alarm units, building management systems, building controllers, industrial subsystems, industrial controllers, lightning systems, air detective systems, air quality sensors, etc. These may correspond to, for example, one or more of the first assets 210 and the second assets 212.

According to an example embodiment, the edge controller 204 is configured to receive at least one of, the telemetry data and model data from the one or more assets corresponding to various independent and diverse sub-systems in the facility 200 (e.g., but not limited to, a building, an industrial plant, a warehouse, a factory, etc.). The one or more assets correspond to various independent and diverse sub-systems in the facility 200. In some examples, the telemetry data may represent time-series data and may include a plurality of data values associated with the assets which may be collected over a period of time. For instance, in an example, the telemetry data may represent a plurality of sensor readings collected by a sensor over a period of time. Further, the model data may represent meta-data associated with the assets. The model data may be indicative of ancillary or contextual information associated with the asset. For instance, in an example, the model data may be representative of geographical information associated with the asset (e.g., location of the asset) within the facility 200. In another example, the model data may represent a sensor setting based on which a sensor is commissioned within a facility 200. In yet another example, the model data may be representative of a data type or a data format associated with the data transacted through the asset. In yet another example, the model data may be indicative of any information which may define a relationship of the asset with one or more other assets in the facility 200. In accordance with various example embodiments described herein, the term 'model data' may be referred interchangeably as 'semantic model' or 'metadata' for purpose of brevity.

In accordance with an example embodiment, the edge controller 204 is configured to discover and identify the one or more assets which are communicatively coupled to the edge controller 204. Further, upon identification of the assets, the example edge controller 204 is configured to pull the telemetry data and/or the model data from the various identified assets. In an example, these assets may correspond to one or more electronic devices that may be located on-premises in the facility 200. The edge controller 204 is configured to pull the data by sending one or more data interrogation requests to the one or more assets. These data interrogation requests may be based on a protocol supported by an underlying one or more assets.

In accordance with an example embodiment, the edge controller 204 is configured to receive the telemetry data and/or the model data in various data formats or different data structures. In an example, a format of the telemetry data and/or the model data, received at the edge controller 204 may be in accordance with a communication protocol of the network supporting transaction of data amongst two or more network nodes (i.e., the edge controller 204 and the asset). As may be appreciated, in some example embodiments, the various assets in the facility 200 may be supported by one or more of various network protocols (e.g., IOT protocols like BACnet, Modbus, LonWorks, SNMP, MQTT, Foxs, OPC UA etc.). Accordingly, and in some cases, the edge controller 204 is configured to pull the telemetry data and/or the model data, in accordance with communication protocol supported by the one or more asset.

In some example embodiments, the edge controller 204 is configured to process the received data and transform the data into a unified data format. The unified data format is referred hereinafter as a common object model. In an example, the common object model is in accordance with an object model that may be required by one or more data analytics applications or services, supported at the cloud 106. In some example embodiments, the edge controller 204 may perform data normalization to normalize the received data into a pre-defined data format. In an example, the pre-defined format may represent a common object model in which the edge controller 204 may further push the telemetry data and/or the model data to the cloud 106. In some example embodiments, the edge controller 204 is configured to establish a secure communication channel with the cloud 106. In this regard, the data may be transacted between the edge controller 204 and the cloud 106, via the secure communication channel. In some example embodiments, the edge controller 204 may send the data to the cloud 106 automatically at pre-defined time intervals. In some example embodiments, at least a part of the data may correspond to historic data. In some example embodiments, the edge controller 204 and/or the cloud 106 may derive the one or more insights associated in the facility 200 based on the common object model as well.

Figure 3:
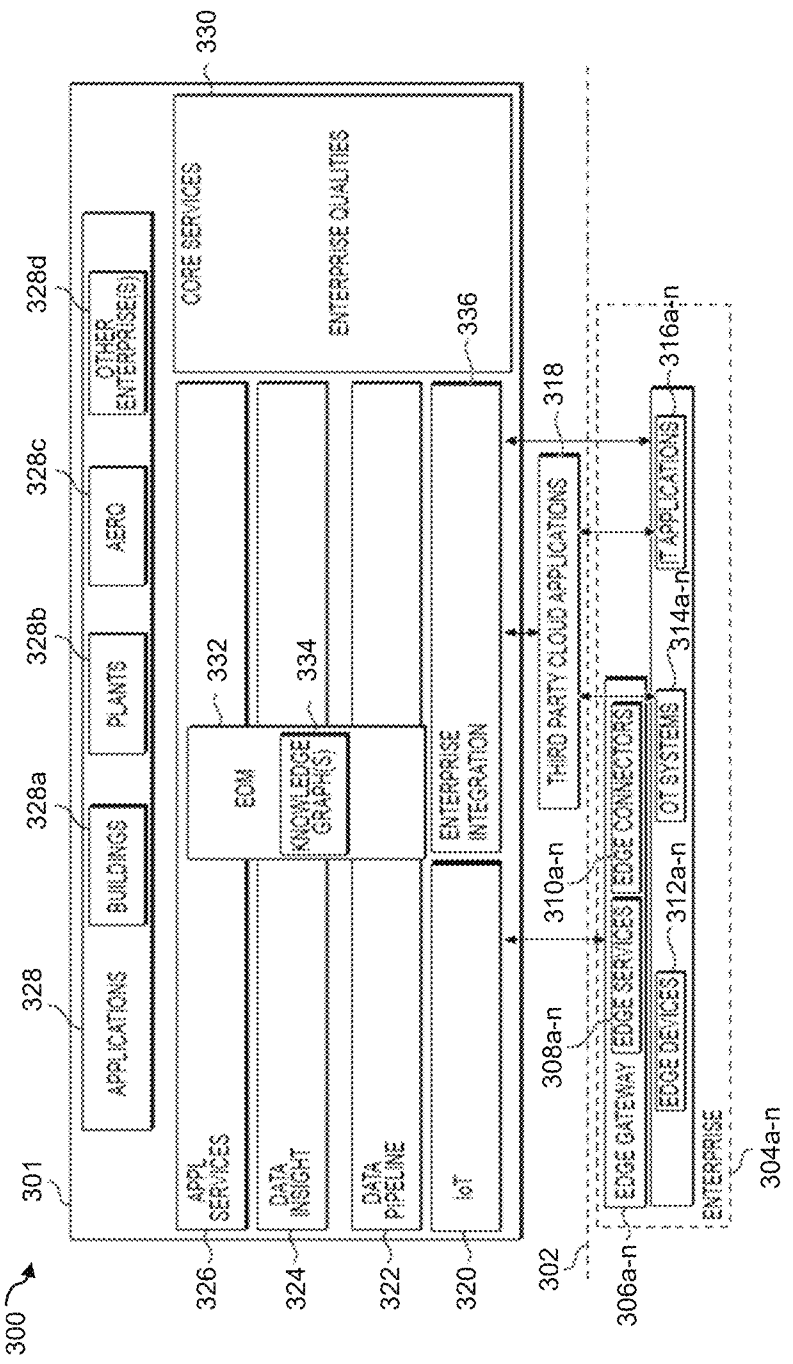
FIG. 3 is a schematic diagram illustrating a framework of an Internet-of-Things (IoT) platform utilized in the facility management system in accordance with one or more embodiments of the present disclosure.

FIG. 3 illustrates a schematic diagram showing a framework of an Internet-of-Things (IoT) platform utilized in a facility management system in accordance with one or more example embodiments described herein. The IoT platform 301 of the present disclosure is a platform used by the emission tracking system that uses real-time accurate models and/or visual analytics to track and manage emissions in a facility. This is done to ensure sustained peak performance of the facility or enterprise 304*a*-304*n*. The IoT platform 301 is an extensible platform that is portable for deployment in any cloud or data center environment for providing an enterprise-wide, top to bottom view, displaying the status of processes, assets, people, and safety. Further, the IoT platform 301 supports end-to-end capability to execute digital twins against process data to determine real-time life-cycle assessment (LCA) values and PCF values associated with the manufactured products and/or processes handled in the facility, using the framework 300, detailed further below.

As shown in FIG. 3, the framework 300 of the IoT platform 301 comprises a number of layers including, for example, an IoT layer 320, an enterprise integration layer 336, a data pipeline layer 322, a data insight layer 324, an application services layer 326, and an applications layer 328. The IoT platform 301 also includes a core services layer 330 and an extensible object model (EOM) 332 comprising one or more knowledge graphs 334. The layers 320-330 further include various software components that together form each layer 320-330. For example, in one or more embodiments, each layer 320-330 includes one or more of the modules, models, engines, databases, services, applications, or combinations thereof. In some embodiments, the layers 320-330 are combined to form fewer layers. In some embodiments, some of the layers 320-330 are separated into separate, more numerous layers. In some embodiments, some of the layers 320-330 are removed while others may be added.

The IoT platform 301 is a model-driven architecture. Also, in some example embodiments, the IoT platform 301 receives telemetry data from one or more assets (e.g., edge devices 312*a*-312*n*). In accordance with certain embodiments, the extensible object model (EOM) 332 communicates with each layer 320-330 to contextualize site data of the enterprise 304*a*-304*n* using an extensible object model (or "asset model") and knowledge graphs 334 where the one or more assets (e.g., edge devices 312*a*-312*n*) and processes of the facility or the enterprise 304*a*-304*n* are modeled. In an example embodiment, the edge devices 312*a*-312*n* may be one of the one or more assets as illustrated in FIGS. 1 and 2 of the current disclosure. The knowledge graphs 334 of EOM 332 are configured to store the models in a central location. The knowledge graphs 334 define a collection of nodes and links that describe real-world connections that enable smart systems. As used herein, a knowledge graph 334: (i) describes real-world entities (e.g., edge devices 312*a*-312*n*) and their interrelations organized in a graphical interface; (ii) defines possible classes and relations of entities in a schema; (iii) enables interrelating arbitrary entities with each other; and (iv) covers various topical domains. In other words, the knowledge graphs 334 define large networks of entities (e.g., edge devices 312*a*-312*n*), semantic types of the entities, properties of the entities, and relationships between the entities. Thus, the knowledge graphs 334 describe a network of "things" that are relevant to a specific domain, an enterprise, or a facility. Knowledge graphs 334 are not limited to abstract concepts and relations, but may also contain instances of objects, such as, for example, documents and datasets. In some example embodiments, the knowledge graphs 334 include resource description framework (RDF) graphs. As used herein, a "RDF graph" is a graph data model that formally describes the semantics, or meaning, of information. The RDF graph also represents metadata (e.g., data that describes data). In some example embodiments, the knowledge graphs 334 comprises data related to operating boundary and/or safety limits associated with each of the one or more assets. Whereas in some example embodiments, the knowledge graphs 334 comprises data related to emissions associated with each of the one or more assets in the facility and/or one or more emission calculations. Also, in some example embodiments, the knowledge graphs 334 comprises data related to standard emissions set by regulatory. In accordance with some example embodiments, the knowledge graphs 334 comprises one or more insights related to emission levels, and/or the like associated with each of the one or more assets. In this regard, the one or more insights of the knowledge graphs 334 may be reasons, opportunities, corrective actions, and/or recommendations associated with the life-cycle assessment (LCA) value so as to effectively manage emissions in the facility. According to various example embodiments, the knowledge graphs 334 may also include a semantic object model. The semantic object model is a subset of a knowledge graph 334 that defines semantics for the knowledge graph 334. For example, the semantic object model defines the schema for the knowledge graph 334.

As used herein, EOM 332 is a collection of application programming interfaces (APIs) that enables seeded semantic object models to be extended. For example, the EOM 332 of the present disclosure enables a customer's knowledge graph 334 to be built subject to constraints expressed in the customer's semantic object model. Thus, the knowledge graphs 334 are generated by customers (e.g., enterprises or organizations) to create models of the edge devices 312*a*-312*n* using their corresponding data in the enterprise 304*a*-304*n*, and the knowledge graphs 334 are input into the EOM 332 for visualizing the models (e.g., the nodes and links). In some example embodiments, knowledge graphs 334 are input into the EOM 332 for visualizing overall emissions of the facility, emissions associated with each of the one or more assets in the facility, impact of emissions associated with an asset on the overall emissions of the facility, and/or the one or more insights.

The models describe the one or more assets (e.g., the nodes) of the enterprise (e.g., the edge devices 312*a*-312*n*) and describe the relationship between the one or more assets (e.g., the links). The models also describe the schema (e.g., describe what the data is), and therefore the models are self-validating. For example, in one or more embodiments, the model describes the type of sensors mounted on any given asset (e.g., edge device 312*a*-312*n*) and the type of data that is being sensed by each sensor. Accordingly, the IoT platform 301 is an extensible, model-driven end-to-end stack including: two-way model sync and secure data exchange between the edge and the cloud, metadata driven data processing (e.g., rules, calculations, and aggregations), and model driven visualizations and applications. As used herein, "extensible" refers to the ability to extend a data model to include new emission data, new standard emission regulations, new rules, new properties, new columns, new fields, new classes, new tables, new operating levels of the one or more assets, new insights, and/or new relations. Thus, the IoT platform 301 is extensible with regards to edge devices 312*a*-312*n* and the applications that handle those devices 312*a*-312*n*. For example, when new edge devices are added to an enterprise 304*a*-304*n* system, the new devices will automatically appear in the IoT platform 301. In addition, the IoT platform 301 receives telemetry data from the new devices along with the existing edge devices 312*a*-312*n*. Accordingly, the IoT platform 301 has the capability to generate models associated operations and/or emissions for the new devices in near-real time based at least on the telemetry data. With this, the corresponding applications 328 may understand and use the data from the new devices to manage the new devices and/or processes in the facility or the enterprise 304*a*-304*n* to ensure effective management of emissions thereby increasing overall throughput of the facility.

In some cases, asset templates are used to facilitate configuration of instances of edge devices 312*a*-312*n* in the model using common structures. An asset template defines the typical properties or parameters for the edge devices 312*a*-312*n* of a given facility or enterprise 304*a*-304*n* for a certain type of device or asset. In this regard, some of the typical properties are static in nature. For example, an asset template of a pump includes modeling the pump having inlet and outlet pressures, speed, flow, etc. In other words, these properties such as pressure, speed, flow etc., for which the pump is configured to measure or sense is static. However, values or measurements sensed by the pump in real-time for the corresponding properties and/or emissions associated with the pump are dynamic in nature. Said alternatively, based on a process handled, a throughput of the enterprise 304*a*-304*n*, and/or a type of material handled by the pump, the measurements and/or the emissions vary dynamically. In this regard, the asset template of the pump may be dynamically updated in a timely manner. Also, it is to be noted that the templates may also include hierarchical or derived types of edge devices 312*a*-312*n* to accommodate variations of a base type of device 312*a*-312*n*. For example, a reciprocating pump is a specialization of a base pump type and would include additional properties in the template. Instances of the edge device 312*a*-312*n* in the model are configured to match the actual, physical devices of the enterprise 304*a*-304*n* using the templates to define expected attributes of the device 312*a*-312*n*. Each attribute is configured either as a static value (e.g., capacity is 1000 BPH) or with a reference to a time series tag that provides the value. The knowledge graph 334 may automatically map the tag to the attribute based on naming conventions, parsing, and matching the tag and attribute descriptions and/or by comparing the behavior of the time series data with expected behavior.

In certain example embodiments, the modeling phase includes an onboarding process for syncing the models between the edge and the cloud. In some example embodiments, the modeling phase may also include construction of the knowledge graph 334 using the telemetry data received from the one or more assets in the enterprise 304*a*-304*n*. For example, in one or more example embodiments, the onboarding process includes a simple onboarding process, a complex onboarding process, and/or a standardized rollout process. The simple onboarding process includes the knowledge graph 334 receiving raw model data from the edge and running context discovery algorithms to generate the model. The context discovery algorithms read the context of the edge naming conventions of the edge devices 312*a*-312*n* and determine what the naming conventions refer to. For example, in one or more example embodiments, the knowledge graph 334 receives "TMP" during the modeling phase and determines that "TMP" relates to "temperature". The generated models are then published. In certain example embodiments, the complex onboarding process includes the knowledge graph 334 receiving the raw model data, receiving point history data, and receiving site survey data. According to various example embodiments, the knowledge graph 334 then uses these inputs to run the context discovery algorithms. According to various example embodiments, the generated models are edited and then the models are published. The standardized rollout process includes manually defining standard models in the cloud and pushing the models to the edge.

The IoT layer 320 includes one or more components for device management, data ingest, and/or command/control of the edge devices 312*a*-312*n*. The components of the IoT layer 320 enable data to be ingested into, or otherwise received at, the IoT platform 301 from a variety of sources. For example, in one or more example embodiments, data is ingested from the edge devices 312*a*-312*n* through process historians or laboratory information management systems. The IoT layer 320 is in communication with the edge connectors 310*a*-310*n* installed on the edge gateways 306*a*-306*n* through network 302, and the edge connectors 310*a*-310*n* send the data securely to the IoT platform 301. In some example embodiments, the edge connectors 310*a*-310*n* may correspond to edge controller 204 described in accordance with FIG. 2 of the current disclosure. In some example embodiments, only authorized data is sent to the IoT platform 301, and the IoT platform 301 only accepts data from authorized edge gateways 306*a*-306*n* and/or edge devices 312*a*-312*n*. According to various example embodiments, data is sent from the edge gateways 306*a*-306*n* to the IoT platform 301 via direct streaming and/or via batch delivery. In some example embodiments, the edge gateways 306*a*-306*n* may correspond to gateway 202 described in accordance with FIG. 2 of the current disclosure. Further, after any network or system outage, data transfer will resume once communication is re-established and any data missed during the outage will be backfilled from the source system or from a cache of the IoT platform 301. According to various example embodiments, the IoT layer 320 also includes components for accessing time series, alarms and events, and transactional data via a variety of protocols.

The enterprise integration layer 336 includes one or more components for events/messaging, file upload, and/or REST/OData. The components of the enterprise integration layer 336 enable the IoT platform 301 to communicate with third party cloud applications 318, such as any application(s) operated by an enterprise in relation to its edge devices. For example, the enterprise integration layer 336 connects with enterprise databases, such as guest databases, customer databases, financial databases, patient databases, etc. The enterprise integration layer 336 provides a standard application programming interface (API) to third parties for accessing the IoT platform 301. The enterprise integration layer 336 also enables the IoT platform 301 to communicate with the OT systems 314*a*-314*n* and IT applications 316*a*-316*n* of the enterprise 304*a*-304*n*. Thus, the enterprise integration layer 336 enables the IoT platform 301 to receive data from the third-party applications 318 rather than, or in combination with, receiving the data from the edge devices 312*a*-312*n* directly. In accordance with some example embodiments, the enterprise integration layer 336 also enables the IoT platform 301 to receive feedback from the personnel in the enterprise 304*a*-304*n* related to operations and/or emissions associated with the one or more assets.

The data pipeline layer 322 includes one or more components for data cleansing/enriching, data transformation, data calculations/aggregations, and/or API for data streams. Accordingly, in one or more example embodiments, the data pipeline layer 322 pre-processes and/or performs initial analytics on the received data. The data pipeline layer 322 executes advanced data cleansing routines including, for example, data correction, mass balance reconciliation, data conditioning, component balancing and simulation to ensure the desired information is used as a basis for further processing. In some example embodiments, the data pipeline layer 322 may process the feedback from personnel to identify new insights, new service cases, new tags, new properties, new columns, new fields, new classes, new tables, and new relations, etc., associated with operations and/or emissions of the one or more assets. The data pipeline layer 322 also provides advanced and fast computation capabilities. For example, in one or more example embodiments, cleansed data is run through enterprise-specific digital twins. According to various example embodiments, the enterprise-specific digital twins include a reliability advisor containing process models to determine the current operation and the fault models to trigger any early detection of faults and/or emissions in order to determine an appropriate resolution. According to various example embodiments, the digital twins also include an optimization advisor that integrates real-time economic data with real-time process and emission data, selects the right feed for a process, and determines optimal process conditions and product yields to effectively manage emissions in the enterprise 304*a*-304*n*.

According to various example embodiments, the data pipeline layer 322 employs models and templates to define calculations and analytics. In accordance with example embodiments, the data pipeline layer 322 employs models and templates to define how the calculations and analytics relate to the one or more assets (e.g., the edge devices 312*a*-312*n*). In one aspect, the calculations and analytics relate to operations associated with the one or more assets. For example, a calculation may relate to determination of carbon footprint values associated with the products and/or co-products manufactured using the one or more assets and/or processes handled using the one or more assets in the facility. In another example, a calculation may relate to correlation of emission level associated with each of the one or more assets in the enterprise 304*a*-304*n*. Further, in another example, a calculation may relate to determination of emission levels that would be associated with each of the one or more assets for a given throughput of the enterprise 304*a*-304*n*. In some example embodiments, the data pipeline layer 322 also employs the calculations and analytics to predict trends associated with the operations and/or emissions associated with the products and/or processes in the facility. For example, a fan template defines fan efficiency calculations such that every time a fan is configured, the standard efficiency calculation is automatically executed for the fan. In another example, a pump template outputs emission calculations such that every time a pump is configured to handle a particular process, the emission calculations is automatically outputted for the pump. The calculation model defines the various types of calculations, the type of engine that should run the calculations, the input and output parameters, the preprocessing requirement and prerequisites, the schedule, expected throughput, etc. According to various example embodiments, the actual calculation or analytic logic is defined in the template or it may be referenced. Thus, according to various example embodiments, the calculation model is employed to describe and control the execution of a variety of different process models and thereby operation of the one or more assets. According to various example embodiments, calculation templates are linked with the asset templates such that when an asset (e.g., edge device 312*a*-312*n*) instance is created, any associated calculation instances are also created with their input and output parameters, operating limits, admissible emission limits, and/or the like linked to the appropriate attributes of the asset (e.g., edge device 312*a*-312*n*). According to various example embodiments, the data pipeline layer 322 may identify one or more insights based on the calculations and analytics as well.

According to various example embodiments, the IoT platform 301 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 304*a*-304*n* performance to identify issues or opportunities, and the potential causes or drivers of the issues or opportunities. The IoT platform 301 includes rich hierarchical symptom-fault models to identify abnormal conditions and their potential consequences. For example, the IoT platform 301 may identify fugitive emissions associated with an asset in the enterprise 304*a*-304*n* as an abnormal condition. Further, in another example, the IoT platform 301 may determine and/or predict a potential consequence based on the fugitive emissions. In this regard, in one or more embodiments, the IoT platform 301 drill downs from a high-level condition to understand the contributing factors, as well as determining the potential impact a lower level condition may have. There may be multiple fault models for a given enterprise 304*a*-304*n* looking at different aspects such as process, equipment, control, and/or operations. According to various example embodiments, each fault model identifies issues and opportunities in their domain, and may also look at the same core problem from a different perspective. According to various example embodiments, an overall fault model is layered on top to synthesize the different perspectives from each fault model into an overall assessment of the situation and point to the true root cause.

According to various example embodiments, when a fault or opportunity is identified, the IoT platform 301 provides one or more corrective actions, predictions, and/or recommendations to be taken in the facility. Initially, the corrective actions, predictions, and/or recommendations are based on expert knowledge that has been pre-programmed into the system by process and equipment experts. The recommendation services module presents this information in a consistent way regardless of source, and supports workflows to track, close out, and document the recommendation follow-up. According to various example embodiments, the recommendation follow-up is employed to improve the overall knowledge of the system over time as existing recommendations are validated (or not) or new cause and effect relationships are learned by users (for example, personnel in the facility) and/or analytics.

According to various example embodiments, the models are used to accurately predict what will occur before it occurs and interpret the status of the installed base. Thus, the IoT platform 301 enables personnel to quickly initiate maintenance measures when irregularities (such as fugitive emissions, asset fault, and/or the like) occur. In some example embodiments, the one or more recommendations may be created to address the irregularities in the enterprise 304*a*-304*n*. According to various example embodiments, the digital twin architecture of the IoT platform 301 employs a variety of modeling techniques. According to various example embodiments, the modeling techniques include, for example, rigorous models, fault detection and diagnostics (FDD), descriptive models, predictive maintenance, prescriptive maintenance, process optimization, and/or any other modeling technique.

According to various example embodiments, the rigorous models are converted from process design simulation. In this manner, in certain example embodiments, process design is integrated with feed conditions. Process changes and technology improvement provide business opportunities that enable more effective maintenance schedule and deployment of resources in the context of production needs with minimal emissions. The fault detection and diagnostics include generalized rule sets that are specified based on industry experience and domain knowledge and may be easily incorporated and used working together with equipment models. According to various example embodiments, the descriptive models identify a problem, and the predictive models determines possible damage levels and maintenance options (say, to mitigate emissions). According to various example embodiments, the descriptive models include models for defining the operating windows and associated operating set points for the edge devices 312*a*-312*n*.

Predictive maintenance includes predictive analytics models developed based on rigorous models and statistic models, such as, for example, principal component analysis (PCA) and partial least square (PLS). According to various example embodiments, machine learning methods are applied to train models for fault prediction. According to various example embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions such as current operating points, current emission levels, etc., rather than time-based maintenance schedule. According to various example embodiments, prescriptive analysis selects the right solution based on the company's capital, operational, and/or other requirements to ensure minimal emissions.

The data insight layer 324 includes one or more components for time series databases (TDSB), relational/document databases, data lakes, blob, files, images, and videos, and/or an API for data query. According to various example embodiments, when raw data is received at the IoT platform 301, the raw data is stored as time series tags or events in warm storage (e.g., in a TSDB) to support interactive queries and to cold storage for archive purposes. According to various example embodiments, data is sent to the data lakes for offline analytics development. According to various example embodiments, the data pipeline layer 322 accesses the data stored in the databases of the data insight layer 324 to perform analytics, as detailed above.

The application services layer 326 includes one or more components for rules engines, workflow/notifications, KPI framework, insights (e.g., actionable insights), decisions, recommendations, machine learning, and/or an API for application services. The application services layer 326 enables building of applications 328*a-d*. The applications layer 328 includes one or more applications 328*a-d* of the IoT platform 301. For example, according to various example embodiments, the applications 328*a-d* includes a buildings application 328*a*, a plants application 328*b*, an aero application 328*c*, and other enterprise applications 328*d*. According to various example embodiments, the applications 328 includes general applications for portfolio management, asset management, autonomous control, and/or any other custom applications. According to various example embodiments, portfolio management includes the KPI framework and a flexible user interface (UI) builder. According to various example embodiments, asset management includes asset performance, asset health, and/or asset predictive maintenance. According to various example embodiments, autonomous control includes energy optimization and/or predictive maintenance. As detailed above, according to various example embodiments, the general applications 328*a-d* is extensible such that each application 328*a-d* is configurable for the different types of enterprises 304*a*-304*n* (e.g., buildings application 328*a*, plants application 328*b*, aero application 328*c*, and other enterprise applications 328*d*).

The applications layer 328 also enables visualization of performance of the enterprise 304*a*-304*n*. For example, dashboards provide a high-level overview with drill downs to support deeper investigations. In some example embodiments, the dashboards provide one or more insights related to Scope 1 and Scope 2 emission levels, real-time PCF values, LCA values and/or the like associated with the products and/or processes in the facility. In this regard, the dashboards provide one or more reasons or issues, opportunities, corrective actions, recommendations, and/or the like as the one or more insights. The real time PCF values enables manufacturers to identify the phases (time of day) when low carbon intense products are produced. This enables manufacturers to get premiums for the low carbon products by guarantying the value chain carbon intensity. Moreover, without much investment in technology upgrades, the manufacturers may identify batches of products that have lower embedded carbon emissions. Also, the dashboards provide one or more service cases based at least on the one or more insights. The one or more insights give users prioritized actions to address current or potential issues and opportunities.

The core services layer 330 includes one or more services of the IoT platform 301. According to various example embodiments, the core services 330 include data visualization, data analytics tools, security, scaling, and monitoring. According to various example embodiments, the core services 330 also include services for tenant provisioning, single login/common portal, self-service admin, UI library/UI tiles, identity/access/entitlements, logging/monitoring, usage metering, API gateway/dev portal, and the IoT platform 301 streams.

Figure 4:
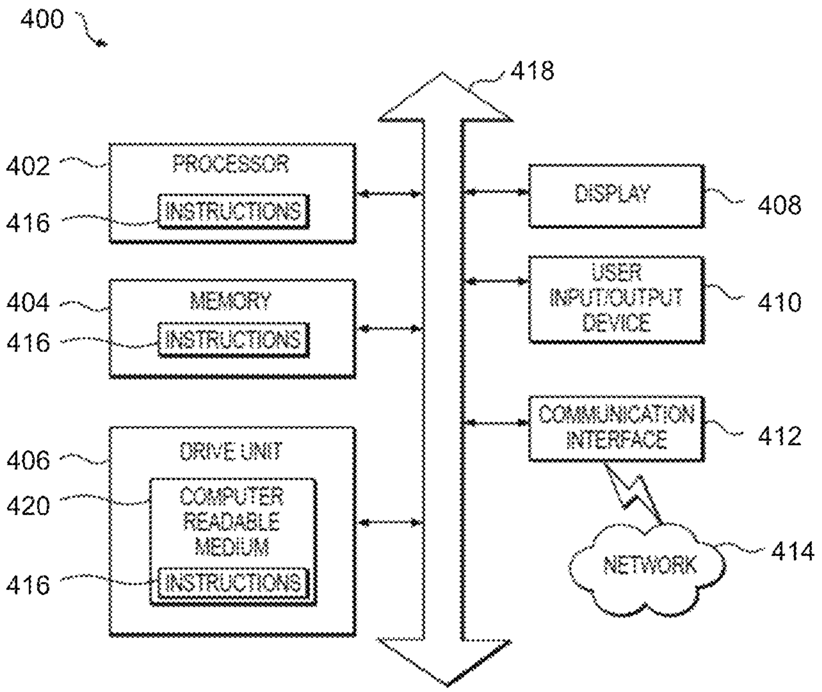
FIG. 4 is a schematic diagram illustrating an implementation of a controller of the facility management system that may execute techniques in accordance with one or more embodiments of the present disclosure.

FIG. 4 illustrates a schematic diagram showing an implementation of a controller that may execute techniques in accordance with one or more example embodiments described herein. The controller 400 may include a set of instructions that may be executed to cause the controller 400 to perform any one or more of the methods or computer-based functions disclosed herein. The controller 400 may operate as a standalone device or may be connected, e.g., using a network, to other computer systems or peripheral devices.

In a networked deployment, the controller 400 may operate in the capacity of a server or as a client in a server-client user network environment, or as a peer computer system in a peer-to-peer (or distributed) network environment. The controller 400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 400 may be implemented using electronic devices that provide voice, video, or data communication. Further, while the controller 400 is illustrated as a single system, the term "system" shall also be taken to include any collection of systems or sub-systems that individually or jointly execute a set, or multiple sets, of instructions to perform one or more computer functions.

As illustrated in FIG. 4, the controller 400 may include a processor 402, e.g., a central processing unit (CPU), a graphics processing unit (GPU), or both. The processor 402 may be a component in a variety of systems. For example, the processor 402 may be part of a standard computer. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The controller 400 may include a memory 404 that may communicate via a bus 418. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 404 includes a cache or random-access memory for the processor 402. In alternative implementations, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the processor 402 executing the instructions stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the controller 400 may further include a display 408, such as a liquid crystal display (LCD), an organic light emitting diode (OLED), a flat panel display, a solid-state display, a cathode ray tube (CRT), a projector, a printer or other now known or later developed display device for outputting determined information. The display 408 may act as an interface for the user to see the functioning of the processor 402, or specifically as an interface with the software stored in the memory 404 or in the drive unit 406.

Additionally or alternatively, the controller 400 may include an input/output device 410 configured to allow a user to interact with any of the components of controller 400. The input/output device 410 may be a number pad, a keyboard, or a cursor control device, such as a mouse, or a joystick, touch screen display, remote control, or any other device operative to interact with the controller 400.

The controller 400 may also or alternatively include drive unit 406 implemented as a disk or optical drive. The drive unit 406 may include a computer-readable medium 420 in which one or more sets of instructions 416, e.g. software, may be embedded. Further, the instructions 416 may embody one or more of the methods or logic as described herein. The instructions 416 may reside completely or partially within the memory 404 and/or within the processor 402 during execution by the controller 400. The memory 404 and the processor 402 also may include computer-readable media as discussed above.

In some systems, a computer-readable medium 420 includes instructions 416 or receives and executes instructions 416 responsive to a propagated signal so that a device connected to a network 414 may communicate voice, video, audio, images, or any other data over the network 414. Further, the instructions 416 may be transmitted or received over the network 414 via a communication port or interface 412, and/or using a bus 418. The communication port or interface 412 may be a part of the processor 402 or may be a separate component. The communication port or interface 412 may be created in software or may be a physical connection in hardware. The communication port or interface 412 may be configured to connect with a network 414, external media, the display 408, or any other components in controller 400, or combinations thereof. The connection with the network 414 may be a physical connection, such as a wired Ethernet connection or may be established wirelessly as discussed below. Likewise, the additional connections with other components of the controller 400 may be physical connections or may be established wirelessly. The network 414 may alternatively be directly connected to a bus 418.

While the computer-readable medium 420 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 420 may be non-transitory, and may be tangible.

The computer-readable medium 420 may include a solid-state memory such as a memory card or other package that houses one or more non-volatile read-only memories. The computer-readable medium 420 may be a random-access memory or other volatile re-writable memory. Additionally or alternatively, the computer-readable medium 420 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, may be constructed to implement one or more of the methods described herein. Applications that may include the apparatus and systems of various implementations may broadly include a variety of electronic and computer systems. One or more implementations described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

The controller 400 may be connected to a network 414. The network 414 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 414 may include wide area networks (WAN), such as the Internet, local area networks (LAN), campus area networks, metropolitan area networks, a direct connection such as through a Universal Serial Bus (USB) port, or any other networks that may allow for data communication. The network 414 may be configured to couple one computing device to another computing device to enable communication of data between the devices. The network 414 may generally be enabled to employ any form of machine-readable media for communicating information from one device to another. The network 414 may include communication methods by which information may travel between computing devices. The network 414 may be divided into sub-networks. The sub-networks may allow access to all of the other components connected thereto or the sub-networks may restrict access between the components. The network 414 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations may include distributed processing, component/object distributed processing, and parallel processing. Alternatively, virtual computer system processing may be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 5:
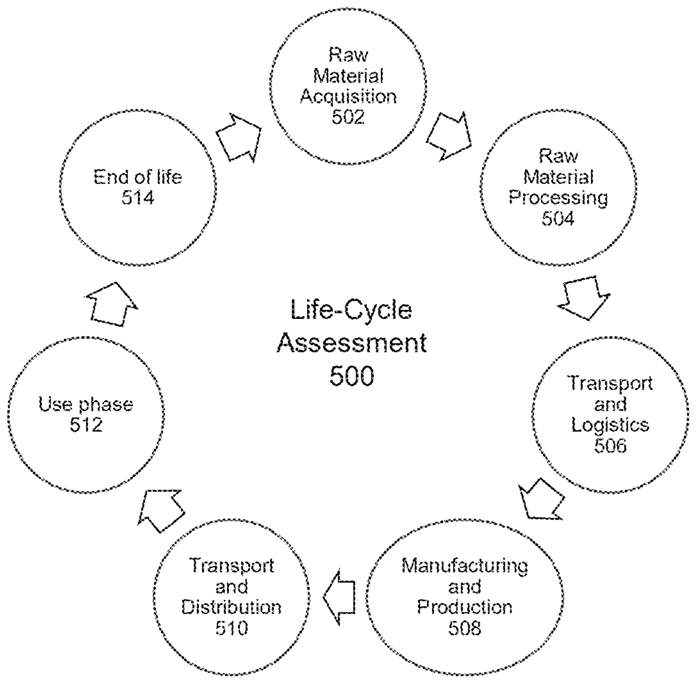
FIG. 5 is an exemplary block diagram illustrating Lifecycle Assessment (LCA) in accordance with one or more embodiments of the present disclosure.

FIG. 5 is an exemplary block diagram illustrating the Life-cycle Assessment (LCA) 500 in accordance with one or more embodiments of the present disclosure. The LCA 500 corresponds to a study to assess environmental impacts associated with all the stages of the life-cycle of the product and/or process. For instance, in the case of a manufactured product, environmental impacts are assessed from raw material extraction and processing, through the product's manufacture, distribution and use, to the recycling or final disposal of the materials composing it. The LCA 500 involves a thorough inventory of the energy and materials that are required across the supply chain and value chain of the product and/or process and calculates the corresponding emissions in the environment. Thus, LCA 500 assesses cumulative potential environmental impacts. The aim is to identify the areas to reduce the environmental footprint corresponding to the product and/or process and improve the overall environmental profile of the product and/or process.

There are two types of life-cycle assessment (LCA)—cradle-to-gate and cradle-to-grave. Firstly, the cradle-to-gate approach measures the cumulative environmental impact of the product from raw material extraction through to the point it leaves the factory gate. The cradle-to-gate approach is a crucial subset of the broader LCA framework. The cradle-to-gate approach examines a product's journey from the extraction of raw materials to the point at which the product is ready to be shipped. It helps quantify the direct emissions and energy use associated with a product's manufacture. This approach is particularly relevant for companies dedicated to reducing their upfront carbon emissions associated with the initial stages of a product's life and seeking compliance with environmental regulations. Secondly, the Cradle-to-grave is the full life cycle assessment from resource extraction, to manufacturing, usage, and maintenance, all the way through to its disposal phase. There are different stages covered by cradle-to-grave approach as described in detail below.

(1) Raw material acquisition 502—The raw material acquisition or extraction assesses the environmental impacts associated with the sourcing and extraction of the raw materials required for manufacturing of the product. It may include extraction of the raw materials such as oils, gases, minerals, metals, fossil fuels, forest products, agriculture resources, and other raw materials from mines, agriculture, and/or forestry using drilling, mining, selective logging, cutting, and/or like.

(2) Raw material processing 504—The raw material processing includes initial processing to prepare raw materials for use in production. Initial processing, often referred to as "pre-processing", involves transforming the raw materials obtained thorough the extraction into the form that is suitable for manufacturing and production. This may include comminution and size reduction to reduce size of the raw materials using crushing, grinding and/or screening, separation and concentration to isolate valuable components and increasing concentration using flotation, magnetic separation, and/or gravity separation, chemical processing to convert raw materials through chemical reactions using leaching, roasting, and/or smelting, purification and refinement to improve purity to meet quality standards using filtration, distillation, and/or electrolytic refining, forming and shaping to prepare materials into usable forms using casting, extrusion, and/or milling, and drying and conditioning to adjust moisture content and conditioning materials.

(3) Transport and Logistics 506—Transportation of raw materials to the manufacturing facility involves the movement of materials from extraction sites to where they will be processed into finished products. This stage ensures that materials are delivered efficiently and cost-effectively while minimizing environmental and logistical impacts. This includes selecting the appropriate modes of transportation based on factors such as, but not limited to distance, cost, volume, and environmental impact. The different modes of transportation may include rail transport, road transport, air transport, ship transport, pipeline transport, and/or like. Further, it includes efficiently managing the loading, unloading, storage, and tracking of raw materials.

(4) Manufacturing and Production 508—Processing raw materials into finished products is a crucial phase in manufacturing, transforming inputs into products ready for use or sale. This stage encompasses a range of processes depending on the type of material and the final product. This stage involves several steps such as, but not limited to, preparation and conditioning, primary processing to create intermediate components, assembly, finishing, designing and packaging the finished product for distribution, and quality control and assurance including ensuring that the product meets quality standards and regulatory requirements.

(5) Transport and Distribution 510—Transporting finished products to distribution centers or retail points involves moving products from the manufacturing facility to various destinations where they will be sold or further distributed. This stage involves distribution planning by developing plans for routes, schedules, and capacity, transportation modes by selecting appropriate transportation methods based on various factors, loading and unloading by handling products during these processes, tracking and monitoring to track shipments, distribution center operations such as managing product receipt and storage, and retain point distribution by coordinating delivery to retail points and ensuring product availability.

(6) Use phase 512—In this stage, the product is actively used by the consumer or in its intended application. This stage involves assessing the energy and resources used during the product's operational life, evaluating the impact of maintaining and repairing the product, analyzing how performance of the product affects environmental impact, understanding emissions and waste produced during use, considering how user behavior influences resource consumption and efficiency, and evaluating the implications of the use phase on the product's end-of-life management.

(7) End of life 514—This is the final stage in the lifecycle of a product, starting from the point when the product is no longer in use until its disposal or recovery. This stage involves disposal methods such as evaluating landfill, incineration, and/or composting impacts, assessing material and energy recovery processes, analyzing mechanical, chemical, and biological treatments, understanding emissions, resource use, and/or waste generation, ensuring compliance with laws and policies, and informing consumers about proper disposal and recycling practices.

In one or more embodiments, the cradle-to-gate approach involves several advantages. The cradle-to-gate approach plays a pivotal role in helping facilities to quantify the environmental impact of their products, from the initial extraction of raw materials to the moment they're ready for transport. This analysis is crucial to reduce the associated carbon footprint early in the product lifecycle and ensuring adherence to environmental regulations. The cradle-to-gate analysis focuses on the upfront stages, allowing facilities to pinpoint and address the most carbon-intensive aspects of their operations. This method emphasizes the importance of accurate data collection and managing the complexity of life-cycle assessments. It also facilitates informed decision-making that can lead to more sustainable material choices and production methods.

Further, in some embodiments, the cradle-to-grave approach includes several advantages. The cradle-to-grave approach provides a comprehensive assessment of a product's environmental footprint throughout its lifecycle. It promotes resource efficiency, waste reduction, and lower carbon footprints. It highlights stages with the highest environmental impacts, enabling targeted improvements. It enables to make decisions that reduce environmental impacts across the entire lifecycle, not just during production. It attracts environmentally conscious consumers by demonstrating a commitment to sustainability and reducing environmental impact. It strengthens brand reputation and value through transparent environmental practices. It highlights areas where resource use and waste may be minimized, leading to cost savings in manufacturing and operation. The cradle-to-grave approach is valuable for understanding the complete environmental impact of products, making it easier to identify opportunities for improvement and make informed decisions that promote sustainability.

Figure 6A:
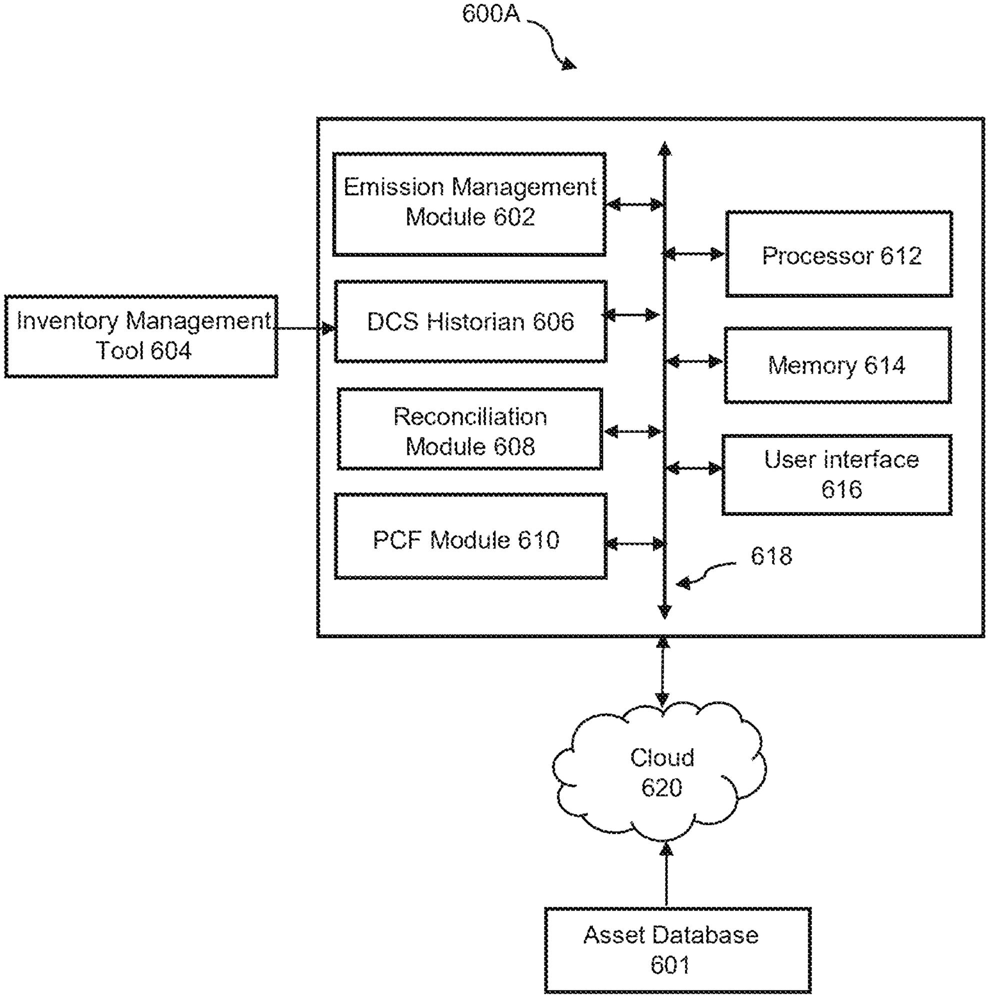
FIG. 6A is an exemplary block diagram illustrating an implementation of an emission tracking system in the facility, in accordance with one or more embodiments of the present disclosure.

FIG. 6A is an exemplary block diagram illustrating an implementation of an emission tracking system 600A in the facility, in accordance with one or more embodiments of the present disclosure. In accordance with one or more example embodiments, the emission tracking system 600A described herein manages emissions associated with the plurality of products, processes and/or assets in the facility. In accordance with one or more example embodiments, the emission tracking system 600A described herein tracks GHG emissions and determines real-time life-cycle assessment (LCA) values and/or carbon footprint values associated with the products and processes. In accordance with one or more example embodiments, the emission tracking system 600A described herein determines cradle-to-gate life-cycle assessment (LCA) value. In accordance with one or more example embodiments, the emission tracking system 600A described herein determines cradle-to-grave life-cycle assessment (LCA) value. In this regard, the emission tracking system 600A collects inventory data associated with the products and processes continuously in real-time from a plurality of data sources. The inventory data may include detailed information related to activities and resources expended during the manufacturing or production process. The real-time Product Carbon Footprint (PCF) values offer several valuable insights corresponding to the carbon intensity of the products and processes during different phases of production. For example, the emission tracking system 600A tracks and analyzes the carbon intensity of products as they are being produced in real time. In another example, the emission tracking system 600A calculates the carbon footprint of products at different times of day or month or year and identifies specific time periods when products are produced with lower carbon emissions due to different factors. Whereas in another example, the emission tracking system 600A evaluates different batches of products to determine their carbon footprint. Further, by comparing emissions data across different production batches, the emission tracking system 600A identifies specific batches have lower embedded carbon emissions. Accordingly, the emission tracking system 600A facilitates a practical application of identifying and optimizing production phases with lower carbon intensity. Further, it supports facilities in achieving sustainability goals and aligning with environmental regulations. Further, real-time LCA values or PCF values allow facilities to improve their carbon footprint management without requiring significant investments in new technology or extensive upgrades. Accordingly, the facilities may adjust production schedules to align with lower carbon intensity periods, optimizing their environmental performance. This further helps in building trust with consumers by demonstrating a commitment to reduce carbon emissions and provide verifiable data. Further, the emission tracking system 600A creates a feedback loop for assessing the impact of operational changes on carbon intensity and making adjustments as needed. Thus, the emission tracking system 600A assists in meeting environmental regulations and standards related to carbon emissions and sustainability.

In one or more embodiments, the emission tracking system 600A monitors emissions associated with a plurality of assets in the facility. The emissions corresponding to the plurality of assets affects the lifecycle emissions of the products and the processes. The emission tracking system 600A incorporates emissions from the use of assets into the product's lifecycle assessment. The emission tracking system 600A utilizes data on the operational emissions of assets to estimate their contribution to the product's emissions. In one embodiment, the emission tracking system 600A allocates a portion of asset emissions to the products based on their share of the production output by applying appropriate emission factors. Further, the impact of asset efficiency on the produced product may also be considered. The emission tracking system 600A identifies opportunities to improve asset efficiency as a measure to reduce emissions corresponding to the products and/or processes.

In one or more embodiments, the emission tracking system 600A receives telemetry data from one or more sensors associated with each of the plurality of assets. Further, the emission tracking system 600A processes the telemetry data to determine one or more insights. For example, the emission tracking system 600A processes the telemetry data to determine emission level associated with an asset. Further, in another example, the emission tracking system 600A processes the telemetry data to determine one or more corrective actions. Whereas in another example, the emission tracking system 600A processes the telemetry data to determine one or more root causes associated with a particular trend of operations or emissions associated with the assets. Also, in some example embodiments, the emission tracking system 600A constructs a model related to the operations or emissions associated with the assets based on the processed telemetry data. In addition, in some example embodiments, the emission tracking system 600A undertakes relevant actions based on the one or more insights. Accordingly, the emission tracking system 600A facilitates a practical application of data analytics technology and/or digital transformation technology to efficiently control the plurality of assets and manage emissions in the facility.

In an example embodiment, the emission tracking system 600A is a server system (e.g., a server device) that facilitates a data analytics platform between one or more computing devices, one or more data sources, and/or one or more assets. In one or more example embodiments, the emission tracking system 600A is a device with one or more processors and a memory. Also, in some example embodiments, the emission tracking system 600A is implementable via the cloud 106. The emission tracking system 600A is implementable in one or more facilities related to one or more technologies, for example, but not limited to, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

In some example embodiments, the emission tracking system 600A comprises one or more components and/or sub-systems such as an asset database 601, an emission management module 602, an inventory management tool 604, a Distributed Control System (DCS) historian 606, a Reconciliation module 608, a PCF module 610, and/or user interface 616. Additionally, in one or more example embodiments, the emission tracking system 600A comprises a processor 612 and/or memory 614. In one or more example embodiments, one or more components and/or sub-systems of the emission tracking system 600A may be communicatively coupled to the processor 612 and/or the memory 614 via a bus 618. In certain example embodiments, one or more aspects of the emission tracking system 600A (and/or other systems, apparatuses and/or processes disclosed herein) constitute executable instructions embodied within a computer-readable storage medium (e.g., the memory 614). For instance, in an example embodiment, the memory 614 stores computer executable component and/or executable instructions (e.g., program instructions). Furthermore, the processor 612 facilitates execution of the computer executable components and/or the executable instructions (e.g., the program instructions). In an example embodiment, the processor 612 is configured to execute instructions stored in memory 614 or otherwise accessible to the processor 612.

The processor 612 is a hardware entity (e.g., physically embodied in circuitry) capable of performing operations according to one or more embodiments of the disclosure. Alternatively, in an example embodiment where the processor 612 is embodied as an executor of software instructions, the software instructions configure the processor 612 to perform one or more algorithms and/or operations described herein in response to the software instructions being executed. In an example embodiment, the processor 612 is a single core processor, a multi-core processor, multiple processors internal to the emission tracking system 600A, a remote processor (e.g., a processor implemented on a server), and/or a virtual machine. In certain example embodiments, the processor 612 is in communication with the memory 614, the asset database 601, the emission management module 602, the inventory management tool 604, the Distributed Control System (DCS) historian 606, the Reconciliation module 608, the PCF module 610, and/or the user interface 616 via the bus 618 to, for example, facilitate transmission of data between the processor 612, the memory 614, the asset database 601, the emission management module 602, the inventory management tool 604, the Distributed Control System (DCS) historian 606, the Reconciliation module 608, the PCF module 610, and/or the user interface 616. In some example embodiments, the processor 612 may be embodied in a number of different ways and, in certain example embodiments, includes one or more processing devices configured to perform independently. Additionally or alternatively, in one or more example embodiments, the processor 612 includes one or more processors configured in tandem via bus 618 to enable independent execution of instructions, pipelining of data, and/or multi-thread execution of instructions.

The memory 614 is non-transitory and includes, for example, one or more volatile memories and/or one or more non-volatile memories. In other words, in one or more example embodiments, the memory 614 is an electronic storage device (e.g., a computer-readable storage medium). The memory 614 is configured to store information, data, content, one or more applications, one or more instructions, or the like, to enable the emission tracking system 600A to carry out various functions in accordance with one or more embodiments disclosed herein. In accordance with some example embodiments described herein, the memory 614 may correspond to an internal or external memory of the emission tracking system 600A. In some examples, the memory 614 may correspond to a database communicatively coupled to the emission tracking system 600A. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor circuitry, an executable component, a thread of instructions, a program, and/or a computer entity.

In one or more embodiments, the asset database 601 may store asset data corresponding to a plurality of assets in the facility. The plurality of assets represents different types of emission sources that are present within the facility. The emission sources may include, but not limited to, stationary sources, mobile sources, or indirect sources. In some example embodiments, at least some of the assets are, but not limited to physical assets such as equipment, machinery, boilers, chillers, Heating, ventilation, and air conditioning (HVAC) systems, turbines, conveyors, and/or like. For example, industrial assets such as machinery or equipment used in manufacturing, processing, or energy production may emit gases such as carbon dioxide (CO2), methane (CH4), nitrous oxide (N2O), sulfur dioxide (SO2), and volatile organic compounds (VOCs). Vehicles used for transporting goods emit carbon dioxide (CO2), nitrogen oxides (NOx), particulate matter (PM), and other pollutants depending on the type of fuel used (gasoline, diesel, electric, etc.). The HVAC system, boilers, and generators may emit carbon dioxide and other gases depending on their energy source (natural gas, oil, electricity). Further, the one or more sensors may correspond to cameras, gas detectors, flow meters, temperature sensors, pressure sensors, heat sensors, flow rate sensors, position sensors, and/or the like. Per this aspect, the one or more sensors sense telemetry data such as emission levels, a type of material handled, a process handled, and/or the like associated with the assets. The emission levels may be calculated via the flow meters, or direct measurement methods such as, but not limited to, gas cloud imaging (GCI), sensors, drones, satellites, etc. In an example, the flow meters may be installed on relevant equipment or pipelines to measure the amount of fuel consumed over a specific period. In another example, the drones may collect visual or sensor data to assess the scale and intensity of activities related to the emissions sources. In yet another example, a gas cloud imaging (GCI) camera may be used to sense emission data (say, gas speciation and concentration along with geospatial co-ordinates) associated with at least some of the emission sources. In this regard, the gas cloud imaging (GCI) camera transmits the emission data to the emission management module 602 (as described in detail below). Further, the asset database 601 may store site or facility specific details such as geographic location details. Furthermore, the asset database 601 may store location information of the assets, asset identification data, maintenance records of the assets, age of the assets, warranty information, fault data, and/or like.

In one or more embodiments, the emission management module 602 applies one or more functions (say, related to emissions) on the asset data, the one or more products, one or more processes and/or the emission factors to calculate Scope 1 emissions in real time. Scope 1 emissions are direct greenhouse (GHG) emissions that occur from sources that are controlled or owned by the facility (e.g., emissions associated with fuel combustion in boilers, furnaces, vehicles). In this regard, the one or more functions may be related to specific type of emissions, emission level associated with the one or more assets, correlation of emission level, emission level associated with one or more products, emission level associated with one or more processes, and/or the like. For example, a function of the one or more functions may determine the Scope 1 emissions associated with one or more workflows of a particular industrial process. In another example, a function of the one or more functions may determine the Scope 1 emissions associated with the one or more products and/or processes. In accordance with some example embodiments, the one or more functions may be based at least in part on historic data associated with the facility. Further, the processor 612 may translate the Scope 1 emission calculations to understandable insights around the emission levels. Also, the emission management module 602 may transmit the Scope 1 emission calculations to the user interface 616 to display the Scope 1 emissions in real-time.

In one or more embodiments, Scope-1 emissions typically include stationary combustion including emissions from burning fossil fuels for energy, such as in boilers, furnaces, and generators, mobile combustion including emissions from vehicles and equipment that are owned or controlled by the facilities, such as company cars, trucks, and construction machinery, process Emissions including emissions from chemical reactions or processes that occur during manufacturing or industrial operations, and fugitive emissions including unintentional leaks of gases from equipment or infrastructure, such as methane leaks from natural gas systems or refrigerants from air conditioning systems. The method of calculating Scope 1 emissions includes collecting activity data related to fuel consumption, energy use, operational data, etc., applying emission factors for different types of fuel, different types of processes or chemical reactions, different types of equipment, nature of leakage, etc., aggregating emissions from all Scope-1 emission sources, documenting the emissions, and reporting the Scope-1 emissions according to regulatory or reporting standards.

In one or more embodiments, the emission management module 602 applies one or more functions (say, related to emissions) on the asset data, the one or more products, one or more processes and/or the emission factors to calculate Scope 2 emissions in real time. Scope 2 emissions are indirect GHG emissions associated with the purchase of electricity, steam, heat, or cooling. Although scope 2 emissions physically occur at other facility where they are generated, they are attributed to the facility's GHG inventory because the energy is used by the facility. Unlike Scope 1 emissions, which come directly from owned or controlled sources, Scope 2 emissions are related to the energy that is purchased and consumed by the facility but generated offsite. Scope 2 emissions are primarily based on grid emissions factor for purchased electricity that fluctuates seasonally as well as in operation hours of the day/night. Scope 2 emissions include emissions from the generation of purchased electricity used by the facility, emissions from the generation of purchased steam used in industrial processes, emissions from the generation of purchased heating or cooling used by the facility. The method of calculating Scope-2 emissions includes collecting activity data related to electricity usage, steam usage, heating and cooling usage, etc., applying emission factors provided by databases or regulatory frameworks that indicate the amount of CO2 equivalent emitted per unit of energy consumed, aggregating emissions from all Scope-2 emission sources, documenting the emissions, and reporting the Scope-2 emissions according to regulatory or reporting standards. Therefore, calculation of Scope-1 and Scope-2 emissions accurately is crucial for managing carbon footprint of the facility, complying with regulations, and setting effective carbon reduction targets. Further, the processor 612 may translate the Scope 2 emission calculations to understandable insights around the emission levels. Also, the emission management module 602 may transmit the Scope 2 emission calculations to the user interface 616 to display the Scope 2 emissions in real-time.

Further, determination of Scope 3 emissions is crucial for a holistic view of total GHG emissions corresponding to products and/or processes. Scope 3 emissions are related to assessing indirect emissions and their implications across a product's lifecycle. Scope 3 emissions are the result of activities from assets not owned or controlled by the facility, but indirectly affects the value chain of the facility. A facility's value chain consists of both its upstream and downstream activities. The GHG Protocol defines 15 categories of scope 3 emissions. Scope 3 emission sources include emissions from both upstream and downstream activities. This includes emissions from the entire value chain, such as upstream emissions from purchased goods and services, capital goods, fuel and energy related activities, upstream transportation and distribution, operational waste, business travel, employee commuting, upstream leased assets, and/or investments, and downstream emissions from downstream transportation and distribution, processing of sold products, use of sold products, end-of-life treatment of products, downstream leased assets, and/or Franchises.

In this regard, the inventory management tool 604 collects inventory data associated with products and/or processes continuously in real-time. The inventory management tool 604 is crucial for managing and optimizing inventory processes. The inventory management tool 604 includes mechanisms for obtaining the real-time inventory data associated with the product and/or process from a plurality of data sources. The inventory data may include information related to the quantities and types of raw materials used in production and information related to activities and resources expended during the manufacturing or production process. One of the plurality of data sources may include an enterprise resource planning (ERP) system. The ERP system like SAP serves as a central repository for the inventory data. It integrates various business functions, including inventory management, procurement, and production, providing a comprehensive view of inventory. The inventory data might also be sourced from other specialized databases or systems, such as warehouse management systems (WMS), customer relationship management (CRM) systems, or supply chain management (SCM) systems. Mechanisms for obtaining the inventory data include an automated data feed mapped to the ERP system or other data sources to continuously collect the inventory data. This ensures real-time or near-real-time updates, reducing the risk of errors and providing up-to-date information. Further, the inventory management module utilizes integration tools and APIs (Application Programming Interfaces) to connect different systems and automate data transfers. This can include ETL (Extract, Transform, Load) processes that handle data extraction, transformation, and loading into the inventory management tool 604. Automated feeds may be set up to pull data from multiple databases into the inventory management tool 604. This allows for a consolidated view of inventory across various systems and data sources. Further, integration of the inventory management tool 604 with ERP system like SAP is done to synchronize the inventory data. This allows for automated updates and ensures that inventory levels are accurately reflected in both the ERP system and inventory management tool 604. The integration provides real-time visibility into inventory levels, production status, and raw material usage. Other mechanisms include manual data entry into the inventory management module through user interfaces or data entry forms. The manual data entry might be used for data not captured automatically or for adjustments and corrections. Manual entries should be validated to ensure accuracy and consistency with other data sources.

The inventory data includes detailed information about all inputs, such as raw material extraction, raw material processing, transport and logistics, manufacturing and production, packaging, and/or utilities and supporting services. The raw material extraction includes information corresponding to mining and quarrying due to emissions from extraction of minerals, metals, and other raw materials, including energy use and fugitive emissions from mines, agriculture due to emissions from farming activities, such as methane from livestock and nitrous oxide from fertilizer application, and forestry due to emissions from logging and land-use changes, including carbon dioxide release from deforestation. The raw material processing includes information corresponding to material processing due to emissions from processing raw materials into intermediate or final forms, such as refining metals, processing oil, or manufacturing chemicals, and energy consumption due to emissions from energy used in the processing stage, including electricity, heat, and fuel. The transport and logistics include information corresponding to modes of transportation due to emissions from transporting raw materials to the manufacturing facility. This includes emissions from vehicles, ships, trains, and planes, and storage due to emissions associated with storing raw materials before they are used in production. The manufacturing and production include information corresponding to energy use due to emissions from the energy consumed in production processes, such as electricity, steam, and fuel for machinery, production processes due to emissions resulting from chemical reactions or processes during manufacturing, such as carbon dioxide emissions from cement production or ammonia emissions from fertilizer production, and waste generation due to emissions from managing and disposing of waste produced during manufacturing, including landfilling and incineration of waste materials. The packaging includes information corresponding to packaging materials due to emissions from the production and use of packaging materials, such as cardboard, plastic, or metal, and packaging process due to emissions from the manufacturing and assembly of packaging materials. The utilities and Supporting services include information corresponding to water use due to emissions related to the treatment and disposal of water used in manufacturing processes and maintenance and operations due to emissions associated with the maintenance and operation of facilities, including heating, ventilation, and air conditioning (HVAC) systems.

In an example embodiment, for a product, let's say steel, the inventory management tool 604 might include details related to raw material extraction (mining iron ore, coal, and limestone), manufacturing of fluxes (dolomite, dunite etc.), material processing such as steelmaking process (converts molten iron to steel using oxygen), transporting the raw material to the iron and steel industry, transport the finished goods steel to customer, and use phase (utilized in construction, automotive, appliances, etc.) & end of life of the steel. By identifying and quantifying these emission sources, facilities may assess the environmental impact of their products and/or processes and identify opportunities for reducing emissions throughout the cradle-to-gate or cradle-to-grave lifecycle. In one or more embodiments, the use phase emission data may be provided by the customers or consumers depending on the use of the manufactured end product.

In one or more embodiments, the DCS historian 606 plays a crucial role in collecting, aggregating, and storing real-time inventory data, which is used for calculating scope 1 emission value, scope 2 emission value, real-time PCF values and/or LCA values. The DCS historian 606 captures the quantity of input to the process in real-time. This involves configuring data transfer protocols and ensuring compatibility between the inventory management tool 604 and the DCS historian 606. The DCS historian 606 collects real-time data on inventory levels, production rates, energy consumption, and other relevant parameters and stores historical data related to past inventory levels, production activities, and material usage for trend analysis and reporting. The DCS historian 606 includes a time-series database that can efficiently handle large volumes of data.

In one or more embodiments, the Reconciliation module 608 cross-checks raw material usage with process inputs consumed to validate that the inventory data aligns correctly with the process data. The Reconciliation module 608 compares the data related to quantities of raw materials with the amounts actually used in the production process, helping to identify discrepancies and errors.

In one or more embodiments, the PCF module 610 may store emission factors corresponding to various emission sources and calculates the PCF values and/or LCA values in real-time associated with the products and/or processes based on the stored inventory data and associated emission factors. The reconciliation layer's output is incorporated into the PCF module 610. The PCF module 610 generates a real-time PCF report that includes the PCF value in real-time. This enables users to alter or adjust the input process parameters of the inventory data and accordingly alter the real-time PCF values and LCA values. Furthermore, the LCA values may be updated in real-time based on a change in input parameters during the process in order to satisfy the quality of the product and/or minimize the emissions. The real-time input adjustment in the inventory data and corresponding updated PCF values and LCA values may be visualized on the user interface 616 in real-time. This allows visualizing the updated PCFs based on actual process data to indicate how adjustments in the production process influence the PCFs. The LCA value is beneficial in assessing the environmental impacts associated with all stages of a product's life, from raw material extraction through manufacturing, use, and disposal. It encompasses a comprehensive evaluation of resource use and emissions throughout a product's lifecycle. LCA value incorporates Scope 1, Scope 2, and Scope 3 emissions as part of its comprehensive approach to evaluating environmental impacts.

In one or more embodiments, the stored emission factors are crucial parameters used to estimate the emissions from various emission sources. The emission factors may be provided by organizations such as Environmental Protection Agency (EPA) in the United States and other governmental or international bodies. The GHG Protocol, developed by the World Resources Institute (WRI) and the World Business Council for Sustainable Development (WBCSD), also provides standardized emission factors for calculating the emissions. These factors have been widely used globally for GHG accounting and reporting. These emission factors represent an average emission rate of a given pollutant for a specific type of source, activity, or fuel consumption. The emission factor is a standardized coefficient that quantify the amount of GHGs emitted per unit of activity. The emission factors may be expressed in units of mass of pollutant per unit of activity, such as grams of carbon dioxide per kilometer traveled by a vehicle or kilograms of methane per metric ton of waste disposed of, and/or like. In one or more embodiments, the PCF module 610 includes an emission factor repository which is a centralized collection of data that helps in estimating emissions of GHGs or pollutants from various products, processes, and activities. The emission factor repository is an essential tool for environmental assessment, regulatory compliance, emissions reporting, and developing emissions inventories. Further, the emission factor repository may be periodically updated to incorporate new emission factors. The emission factor repository may include metadata such as source of the emission factor, methodology used for the calculation, and/or any other specific conditions. The emission factors may be categorized in the emission factor repository based on the pollutant type and/or the emission source. In some example embodiments, the overall emissions at the specific site or the facility may be calculated using emission factors that quantify an amount of CO2-equivalent emissions produced per unit of activity or energy consumed.

Further, in one or more embodiments, the flexibility to add measure-informed natural gas value chain leakage rates instead of emission factors is a big advantage and one of the key differentiators. Ultimately, this results in the real-time PCF as an output that changes dynamically in time and is more accurate, reliable and transparent for reporting to government regulations. This real time PCF tool enables manufacturers to identify the phases (time of day) when low carbon intense products are produced. This enables manufacturers to get premiums for the low carbon products by guarantying the value chain carbon intensity. Moreover, without much investment in technology upgrades, the present invention helps identification of batches of products that have lower embedded carbon emissions.

In one or more embodiments, the PCF module 610 comprises one or more threshold product carbon footprint (PCF) values associated with the products/processes in the facility. In this regard, the one or more threshold PCF values may represent values for emissions in the facility. The one or more threshold PCF values may indicate permissible emissions associated with the products and/or processes. Ideally, the total actual emissions should not exceed the one or more threshold PCF values. Per this aspect, the processor 612 may determine if the facility is in compliance standards prescribed by regulatory based on the one or more threshold PCF values. For instance, if the real-time PCF values associated with the products and/or processes exceed the one or more threshold PCF values, then the processor 612 may determine non-compliance with the standards. Whereas in another instance, if the comparison of the real-time PCF values exceeds the one or more threshold PCF values, then the processor 612 may identify one or more corrective actions (discussed in detail below).

In one or more embodiments, the PCF module 610 may determine at least one change in parameters of the inventory data based on the one or more threshold PCF values. The at least one change in the parameters of inventory data may be change in the quantity of the raw material, change in the type of the raw material, a change in the activity data, and a change in the energy data. In one or more embodiments, the change in the activity data includes modifying activity data, such as production volumes, operational hours, or process types, to affect inventory management and PCF values. In one or more embodiments, the change in the energy data includes adjusting energy consumption or energy sources to reduce the carbon footprint associated with energy use. For example, switching from coal-based energy to solar power may significantly lower the carbon footprint of the energy usage, thus reducing the PCF of products and/or processes. Further, the one or more threshold PCF values depends on at least one of industry standards or benchmarks, industry regulations, a quantity of raw material, type of raw material, type of the product, type of the process, and a geographical location of the facility. In one or more embodiments, the one or more threshold PCF values may depend on the quantity of the raw material as larger quantities of raw material might increase the PCF if the raw material is carbon intensive. In one or more embodiments, the one or more threshold PCF values may depend on the type of the raw material as different materials may have different carbon footprints. In one or more embodiments, the one or more threshold PCF values may depend on the type of the product as the product with complex assembly or that uses multiple raw materials might have a higher PCF. In one or more embodiments, the one or more threshold PCF values may depend on the type of the process as the process that use more energy or have higher emissions will contribute to a higher PCF. The one or more threshold PCF values indicates a maximum acceptable carbon footprint value for the product and/or process.

In one or more embodiments, the PCF module 610 may determine an updated PCF value based on one or more changes in the inventory data in real-time. The PCF module 610 is typically designed to integrate various inputs, such as raw material quantities, types of raw materials, energy consumption, and activity data, to provide a comprehensive calculation of the product's carbon footprint. The PCF module 610 may ensure that all relevant parameters and settings are updated to reflect the changes in the inventory data. The PCF module 610 may be configured to consider the latest data inputs for determining the updated PCF value. In one or more embodiments, the PCF module 610 may determine PCF values corresponding to different stages of the life-cycle assessment of the product and/or process in real-time. Common stages might include raw material extraction, manufacturing/production, distribution/transportation, and/or like.

Further, in some example embodiments, the emission tracking system 600A may utilize the machine learning algorithm to provide the one or more insights based on the determined PCF values and LCA values associated with the products and/or processes. Said alternatively, the machine learning algorithm comprises one or more models that can be used by the emission tracking system 600A to provide the one or more insights. Also, in some example embodiments, the machine learning algorithm may be trained with one or more datasets to facilitate provision of the one or more insights. In this regard, the one or more datasets may be related to asset data stored in the asset database 601 and emissions associated with the assets, products, and/or processes in the facility. In some example embodiments, the one or more datasets may be, but not limited to historical data related to emissions the facility, emission profile associated with the facility, emission profiles for particular products and/or processes in the facility, emission intensities of particular gases in the facility, regulatory standards, historical financial impacts, historical corrective actions, historical opportunities, historical recommendations, historical predictions, and/or the like. Additionally, in some example embodiments, the one or more insights may be provided as feedback. Whereas in some example embodiments, the personnel in the facility may also provide feedback on the one or more insights or input actions undertaken by them. In this regard, the machine learning algorithm may learn over time to provide improved and accurate insights. For example, the emission tracking system 600A may flag one or more actions taken by the personnel in the facility if they are determined to have caused a spike in emissions in the facility. In another example, the emission tracking system 600A may generate new insights based on one or more actions taken by personnel in the facility. Also, in some example embodiments, the machine learning algorithm may be trained with one or more new datasets on a regular basis or for a pre-defined time interval to improve relevancy of insights.

Further, in some example embodiments, the one or more insights may be transmitted to the user interface 616. Per this aspect, the one or more insights may be rendered on the user interface 616. In one or more embodiments, the user interface 616 is configured to display the one or more insights. The one or more insights may be presented in the form reports, dashboard, descriptions, charts, trends, graphs, and/or like. The one or more insights may be related to Scope 1 emission value, Scope 2 emission value, real-time PCF values, real-time LCA values, recommendations, and/or like. In one or more example embodiments, one or more corrective actions related to the real-time PCF values may be rendered on the user interface 616. In another example, financial implications related to emissions may be rendered on the user interface 616. In another example, one or more recommendations related to the carbon offsetting may be rendered on the user interface 616. Yet in another example, the one or more root causes related to the emissions may be rendered on the user interface 616. The user interface 616 may correspond to an interface of a device associated with personnel in the facility. In one example, the user interface 616 may correspond to an interface of a device associated with an operator or the personnel in the facility. In another example, the user interface 616 may correspond to an interface of a device associated with a supervisor of the operator in the facility. In some example embodiments, one or more alert signals may be generated based on the one or more insights. In some example embodiments, the one or more alert signals may be transmitted to the user interface 616. In this regard, in some example embodiments, one or more notifications may be generated on the user interface 616 based on the one or more alert signals. Accordingly, in some examples, the one or more notifications may be visual notifications. Whereas, in some examples, the one or more notifications may be audio notifications. Also, in some example embodiments, the user interface 616 may allow the personnel to provide input and/or feedback regarding the one or more insights. For example, an input may correspond an operator selecting a corrective action. In this regard, the one or more insights may be rendered as visualizations, such as on the user interface 616, to help the personnel such as field operators to identify the one or more insights and thereby undertake appropriate actions.

Further, in some example embodiments, the user interface 616 is configured to display scope 1 emission data and scope 2 emission data. Further, the user interface 616 is configured to display the PCF values corresponding to the different stages of the life-cycle assessment of the product and/or the process in the facility. In an example, the PCF values for different stages of the product and/or the process may be displayed side-by-side using tables. In another example, the PCF values for different stages of the product and/or the process may be displayed using charts or graphs. This may include bar charts, pie charts, or line graphs. In or more embodiments, the user interface 616 may allow users to click on or hover over different stages of the life-cycle assessment to view detailed PCF value data and underlying parameters such as raw material usage, energy consumption, process emission, asset emission data, and/or like. In or more embodiments, the user interface 616 may implement interactive features such as dropdowns or sliders to filter and view PCF value data based on various factors like time periods or production runs. In or more embodiments, the user interface 616 may visually represent changes in different PCF values at different stages based on changes in the inventory data. This helps in identifying specific stages with the highest emissions, enabling targeted actions to improve sustainability. Further, by providing PCF values for each stage, decision-makers may understand the environmental impact corresponding to each stage, leading to more informed choices that reduce overall carbon footprint.

In some example embodiments, the one or more components, one or more sub-systems, processor 612 and/or memory 614 of the emission tracking system 600A may be communicatively coupled to cloud 620 over a network. In this regard, the one or more components, processor 612 and/or memory 614 along with the cloud 620 control the plurality of products, processes and/or assets and manage emissions in the facility. In some example embodiments, the network may be for example, a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, a BACnet network, a NIAGARA network, a NIAGARA CLOUD network, and/or another type of network. In some example embodiments, the telemetry data received from the one or more assets may be transmitted to the cloud 620. In some example embodiments, the cloud 620 may be configured to perform one or more operations/functionalities of the one or more components, one or more sub-systems, processor 612 and/or memory 614 of the emission tracking system 600A.

Figure 6B:
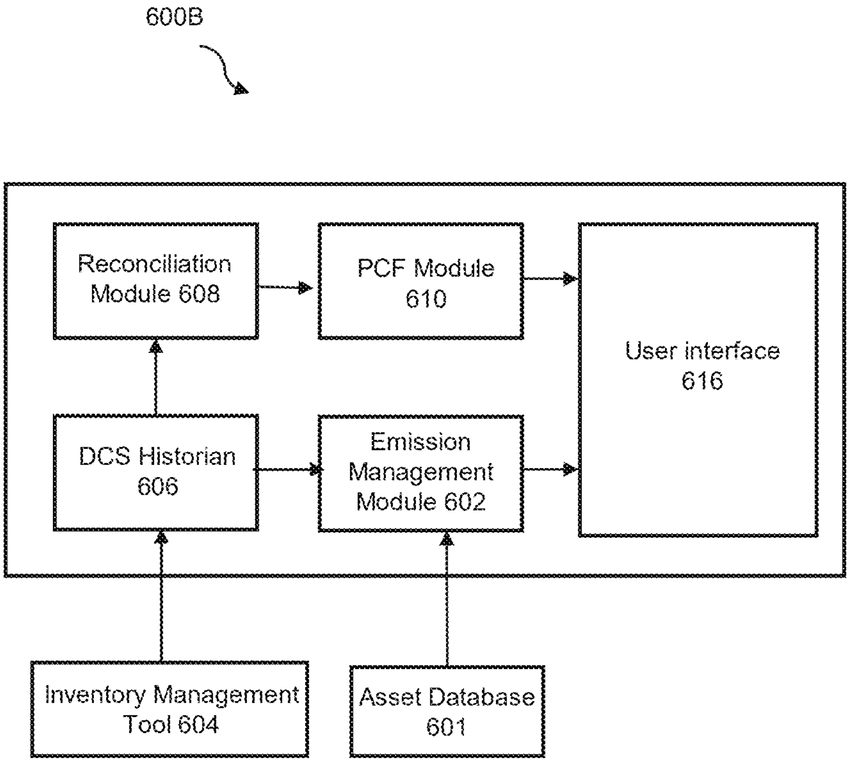
FIG. 6B is a schematic diagram illustrating the exemplary emission tracking system in accordance with one or more embodiments of the present disclosure.

FIG. 6B illustrates a schematic diagram showing an exemplary emission tracking system 600B in accordance with one or more embodiments of the present disclosure. In some example embodiments, exemplary emission tracking system 600B described herein corresponds to the emission tracking system 600A described in FIG. 6A of the current disclosure. According to various example embodiments described herein, the emission tracking system 600B comprises one or more components such as the asset database 601, the emission management module 602, the inventory management tool 604, the Distributed Control System (DCS) historian 606, the Reconciliation module 608, the PCF module 610, and/or the user interface 616. In accordance with one or more example embodiments, the aforementioned one or more components facilitate the emission tracking system 600B to provide scope 1 emission data, scope 2 emission data, real-time LCA values and PCF values associated with products and/or processes as described in FIG. 6A of the current disclosure.

In one or more example embodiments, the asset database 601 may store asset data corresponding to a plurality of assets in the facility. The plurality of assets represents different types of emission sources that are present within the facility.

In one or more embodiments, the emission management module 602 applies one or more functions (say, related to emissions) on the asset data, the one or more products, one or more processes and/or the emission factors to calculate Scope 1 emissions in real time. Scope 1 emissions are direct greenhouse (GHG) emissions that occur from sources that are controlled or owned by the facility (e.g., emissions associated with fuel combustion in boilers, furnaces, vehicles). In one or more embodiments, the emission management module 602 applies one or more functions (say, related to emissions) on the asset data, the one or more products, one or more processes and/or the emission factors to calculate Scope 2 emissions in real time. Scope 2 emissions are indirect GHG emissions associated with the purchase of electricity, steam, heat, or cooling.

Further, determination of Scope 3 emissions is crucial for a holistic view of total GHG emissions corresponding to products and/or processes. Scope 3 emissions are related to assessing indirect emissions and their implications across a product's lifecycle. Scope 3 emissions are the result of activities from assets not owned or controlled by the facility, but indirectly affects the value chain of the facility. In this regard, the inventory management tool 604 collects inventory data associated with products and/or processes in real-time. The inventory management tool 604 includes mechanisms for obtaining the real-time inventory data associated with the products and/or processes from a plurality of data sources. The inventory data may include information related to the quantities and types of raw materials used in production and information related to activities and resources expended during the manufacturing or production process.

In one or more embodiments, the DCS historian 606 plays a crucial role in collecting, aggregating, and storing real-time inventory data, which is used for calculating scope 1 emission value, scope 2 emission value, real-time PCF values and/or LCA values. The DCS historian 606 captures the quantity of input to the process in real-time.

In one or more embodiments, the Reconciliation module 608 cross-checks raw material usage with process inputs consumed to validate that the inventory data aligns correctly with the process data. The Reconciliation module 608 compares the data related to quantities of raw materials with the amounts actually used in the production process, helping to identify discrepancies and errors.

In one or more embodiments, the PCF module 610 may store emission factors corresponding to various emission sources and calculates the PCF values and/or LCA values in real-time associated with the products and/or processes based on the stored inventory data and associated emission factors. The reconciliation layer's output is incorporated into the PCF module 610. The PCF module 610 generates a real-time PCF report that includes the PCF value in real-time. This enables users to alter or adjust the input process parameters of the inventory data and accordingly alter the real-time PCF values and LCA values. Furthermore, the LCA values may be updated in real-time based on a change in input parameters during the process in order to satisfy the quality of the product and/or minimize the emissions. The real-time input adjustment in the inventory data and corresponding updated PCF values may be visualized on the user interface 616 in real-time. The LCA value is beneficial in assessing the environmental impacts associated with all stages of a product's life, from raw material extraction through manufacturing, use, and disposal. It encompasses a comprehensive evaluation of resource use and emissions throughout a product's lifecycle. LCA value incorporates Scope 1, Scope 2, and Scope 3 emissions as part of its comprehensive approach to evaluating environmental impacts.

Further, in some example embodiments, the emission tracking system 600A may utilize the machine learning algorithm to provide the one or more insights based on the determined PCF values and LCA values associated with the products and/or processes. Further, in some example embodiments, the one or more insights may be transmitted to the user interface 616. Per this aspect, the one or more insights may be rendered on the user interface 616. In one or more embodiments, the user interface 616 is configured to display the one or more insights. The one or more insights may be presented in the form reports, dashboard, descriptions, charts, trends, graphs, and/or like. The one or more insights may be related to Scope 1 emission value, Scope 2 emission value, real-time PCF values, real-time LCA values, recommendations, and/or like.

Figure 7:
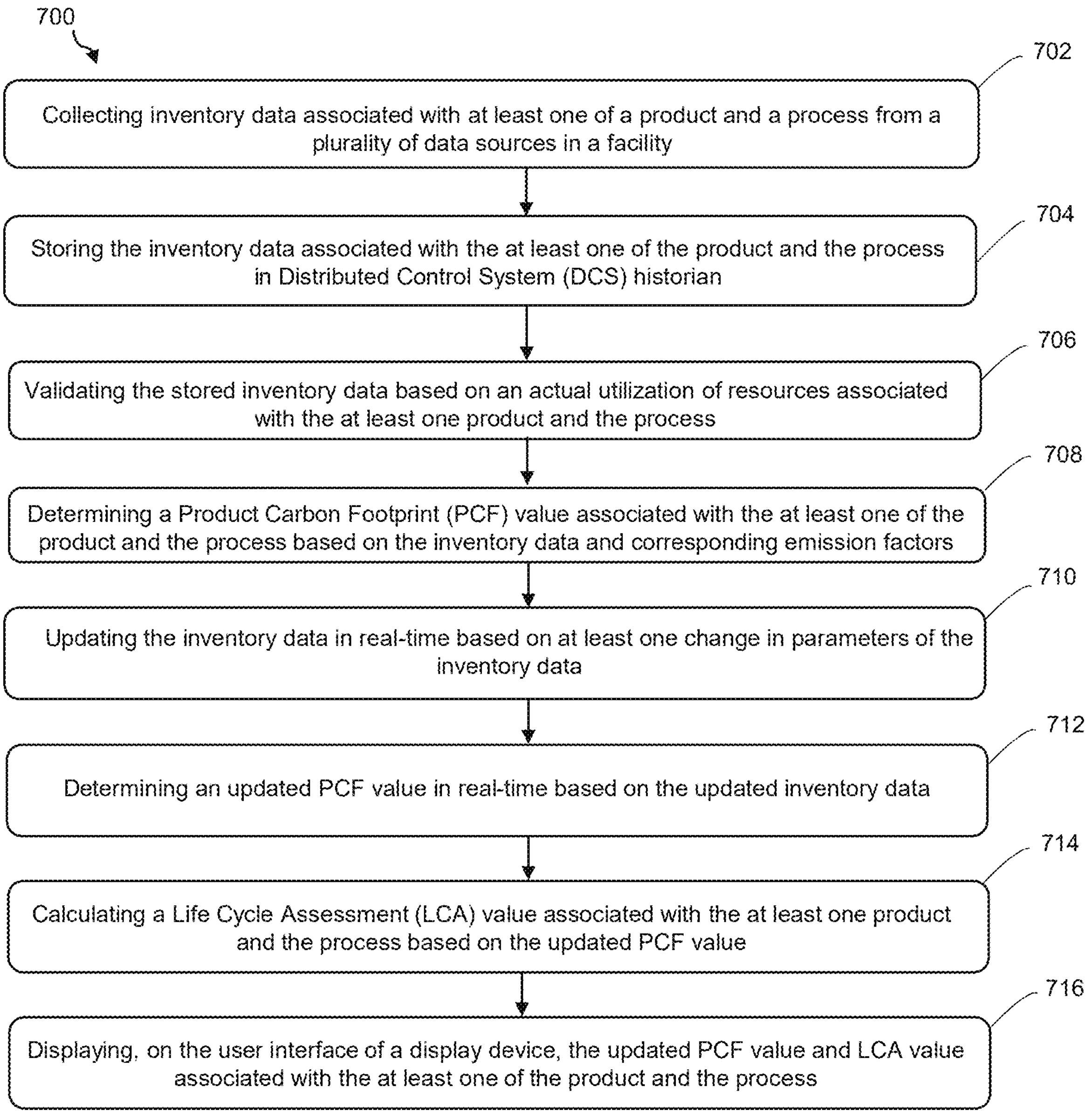
FIG. 7 is a flowchart illustrating a method described in accordance with one or more embodiments of the present disclosure.

FIG. 7 is a flowchart illustrating example operations of tracking emissions associated with the plurality of products, processes and/or assets in the facility, in accordance with one or more embodiments of the present disclosure. An exemplary flowchart 700 describes an exemplary method for tracking emissions in the facility via the emission tracking system 600A (or 600B). At step 702, the emission tracking system 600A includes means, such as the inventory management tool 604 to collect inventory data associated with the products and/or processes in real-time. At step 704, the emission tracking system 600A includes means, such as the DCS historian 606 to store the inventory data associated with the products and/or processes. Further, at step 706, the emission tracking system 600A includes means, such as the Reconciliation module 608 to validate the stored inventory data based on an actual utilization of resources associated with the products and/or processes. At step 708, the emission tracking system 600A includes means, such as the PCF module 610 to determine PCF values associated with the products and/or processes based on the inventory data and corresponding emission factors. At step 710, the emission tracking system 600A includes means, such as the inventory management tool 604 to update the inventory data in real-time based on at least one change in parameters of the inventory data. At step 712, the emission tracking system 600A includes means, such as the PCF module 610 to determine updated PCF values in real-time based on the updated inventory data. At step 714, the emission tracking system 600A includes means, such as the PCF module 610 to determine LCA values associated with the products and/or processes based on the updated PCF values. At step 716, the emission tracking system 600A includes means, such as the user interface 616 to display the updated PCF values and LCA values associated with the products and/or processes.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system, comprising:

a processor; and a non-transitory memory communicatively coupled to the processor, wherein the memory comprises one or more instructions which when executed by the processor, cause the processor to:

collect, via an inventory management tool, a inventory data associated with at least one of a product and a process from a plurality of data sources in a facility, wherein the inventory data comprises at least raw material usage data, energy consumption data and process activity data, wherein the inventory data is a real-time data;

reconcile the inventory data with a process input data obtained from a control system historian to validate actual resource consumption associated with the product or the process;

determine, using a Product Carbon Footprint (PCF) computation module, a Product Carbon Footprint (PCF) value associated with the at least one of the product and the process by applying corresponding emission factors to the reconciled inventory data;

monitor the reconciled inventory data associated with at least one of the product and the process of the facility to detect an occurrence of at least one change in one or more parameters of the inventory data;

in response to detecting the occurrence of the at least one change, automatically update the inventory data in real-time;

dynamically determine an updated PCF value in real-time upon detecting the at least one change in parameters of the inventory data; and display, via a user interface of a display device operatively coupled to the processor, the updated PCF value associated with the at least one of the product and the process to enable real-time monitoring of emissions generated during operation in the facility.

2. The system of claim 1, wherein the processor is further configured to determine the at least one change in the parameters of the inventory data based on a threshold PCF value, and wherein the threshold PCF value is based on at least one of industry standards, a quantity of raw material, type of raw material, type of the product, type of the process, and a geographical location of the facility.

3. The system of claim 1, wherein the processor is further configured to:

determine PCF values corresponding to different stages of a life-cycle assessment of the at least one of the product and the process in real-time; and display, via the user interface, the PCF values corresponding to the different stages of the life-cycle assessment of the at least one of the product and the process.

4. The system of claim 1, wherein the processor is further configured to store the inventory data associated with the at least one of the product and the process in Distributed Control System (DCS) historian, wherein the inventory data includes data related to resources associated with at least one of the product and the process, and wherein the data related to the resources includes at least one of raw material data, energy data, transport and logistics data, and activity data.

5. The system of claim 1, wherein the processor is further configured to validate a stored inventory data based on an actual utilization of resources associated with at least one of the product and the process.

6. The system of claim 1, wherein the processor is further configured to:

calculate a Life Cycle Assessment (LCA) value associated with at least one of the product and the process based on the updated PCF value; and identify at least one corrective action based on the LCA value.

7. The system of claim 1, wherein the at least one change in the parameters of the inventory data includes at least one of a change in a quantity of the raw material, a change in a type of the raw material, a change in activity data, and a change in energy data.

8. The system of claim 1, wherein the processor is further configured to:

determine measure-informed natural gas value chain leakage rates; and determine the PCF value based on the measure-informed natural gas value chain leakage rates.

9. The system of claim 1, wherein at least one of the plurality of data sources includes Systems Applications and Products (SAP) tool.

10. The system of claim 1, wherein the processor is further configured to determine Carbon Intensity (CI) value in real-time associated with at least one of the product and the process based on the updated PCF value.

11. A method, comprising:

collecting, by a processor via inventory management tool, a real-time inventory data associated with at least one of a product and a process from a plurality of data sources in a facility, wherein the real-time inventory data comprises at least raw material usage data, energy consumption data and process activity data, wherein the inventory data is a real-time data;

reconciling, by the processor, the inventory data with a process input data obtained from a control system historian to validate actual resource consumption associated with the product or the process;

determining, using a Product Carbon Footprint (PCF) computation module executed by the processor, a Product Carbon Footprint (PCF) value associated with the at least one of the product and the process by applying corresponding emission factors to the reconciled inventory data;

monitoring the reconciled inventory data associated with at least one of the product or process of the facility to detect an occurrence of at least one change in one or more parameters of the real-time inventory data;

in response to detecting the occurrence of the at least one change, automatically update the inventory data in real-time;

dynamically determining, by the processor, an updated PCF value in real-time upon detecting the at least one change in parameters of the inventory data; and displaying, via a user interface of a display device operatively coupled to the processor, the updated PCF value associated with the at least one of the product and the process to enable real-time monitoring of emissions generated during operation of the facility.

12. The method of claim 11, further comprising determining the at least one change in the parameters of the inventory data based on a threshold PCF value, and wherein the threshold PCF value is based on at least one of industry standards, a quantity of raw material, type of raw material, type of the product, type of the process, and a geographical location of the facility.

13. The method of claim 11, further comprising:

determining PCF values corresponding to different stages of a life-cycle assessment of the at least one of the product and the process in real-time; and displaying, via the user interface, the PCF values corresponding to the different stages of the life-cycle assessment of the at least one of the product and the process.

14. The method of claim 11, further comprising storing the inventory data associated with the at least one of the product and the process in Distributed Control System (DCS) historian, wherein the inventory data includes data related to resources associated with at least one of the product and the process, and wherein the data related to the resources includes at least one of raw material data, energy data, transport and logistics data, and activity data.

15. The method of claim 11, further comprising validating a stored inventory data based on an actual utilization of resources associated with at least one of the product and the process.

16. The method of claim 11, further comprising:

calculating a Life Cycle Assessment (LCA) value associated with at least one of the product and the process based on the updated PCF value; and identifying at least one corrective action based on the LCA value.

17. The method of claim 11, wherein the at least one change in the parameters of the inventory data includes at least one of a change in a quantity of the raw material, a change in a type of the raw material, a change in activity data, and a change in energy data.

18. The method of claim 11, further comprising:

determining measure-informed natural gas value chain leakage rates; and determining the PCF value based on the measure-informed natural gas value chain leakage rates.

19. The method of claim 11, wherein at least one of the plurality of data sources includes Systems Applications and Products (SAP) tool.

20. The method of claim 11, further comprising determining Carbon Intensity (CI) value in real-time associated with at least one of the product and the process based on the updated PCF value.

* * * * *